US012659208B2

(12) United States Patent (10) Patent No.: US 12,659,208 B2
Liu et al. (45) Date of Patent: Jun. 16, 2026

(54) COMMUNICATION METHOD IN WIRELESS LOCAL AREA NETWORK AND RELATED APPARATUSES

(71) Applicant: HUAWEI TECHNOLOGIES CO., LTD., Guangdong (CN)

(72) Inventors: Chenchen Liu, Shenzhen (CN); Bo Gong, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 18/493,885

(22) Filed: Oct. 25, 2023

(65) Prior Publication Data

US 2024/0056342 A1 Feb. 15, 2024

Related U.S. Application Data

(63) Continuation of application No. PCT/CN2022/086830, filed on Apr. 14, 2022.

(30) Foreign Application Priority Data

Apr. 26, 2021 (CN) .......................... 202110455187.4

(51) Int. Cl.
 *H04L 27/26* (2006.01)
 *H04L 5/00* (2006.01)
(52) U.S. Cl.
 CPC .......... *H04L 27/2621* (2013.01); *H04L 5/001* (2013.01); *H04L 5/0044* (2013.01); *H04L 27/2602* (2013.01)
(58) Field of Classification Search
 CPC ................. H04L 27/2621; H04L 5/001; H04L 5/0044; H04L 27/2602; H04L 27/2614; Y02D 30/70; H04W 84/12
 See application file for complete search history.

(56) References Cited

U.S. PATENT DOCUMENTS

| | | | |
|---|---|---|---|
| 10,097,393 B1 | 10/2018 | Huang et al. | |
| 10,530,625 B2 * | 1/2020 | Park | H04L 27/2614 |
| 2004/0170228 A1 * | 9/2004 | Vadde | H04L 25/497 |
| | | | 375/260 |

(Continued)

FOREIGN PATENT DOCUMENTS

WO 2022033450 A1 2/2022

OTHER PUBLICATIONS

Chenchen Liu(Huawei): "Discussions on PAPR Reduction Methods for DUP Mode", Aug. 2020, IEEE 802.11-20/1206r1, pp. 1-14, XP068173626.

(Continued)

*Primary Examiner* — Oussama Roudani

(57) ABSTRACT

A communication method and related apparatuses are disclosed. The method includes: A communication apparatus generates and sends a first frequency domain signal, where the first frequency domain signal includes a subsignal obtained by mapping N pieces of first frequency domain data to a first group of subcarriers and a subsignal obtained by mapping N pieces of second frequency domain data to a second group of subcarriers, and a spacing between the first group of subcarriers and the second group of subcarriers is odd-numbered subcarriers. The N pieces of first frequency domain data are obtained by multiplying data at even positions or data at odd positions in N pieces of original frequency domain data by i or −i, and the N pieces of second frequency domain data are obtained by performing reverse arrangement and/or negation on the N pieces of first frequency domain data.

19 Claims, 8 Drawing Sheets

(56) References Cited

U.S. PATENT DOCUMENTS

| 2009/0225647 A1* | 9/2009 | Matsumoto | ............... H04L 1/08 |
| | | | 370/210 |
| 2016/0286551 A1* | 9/2016 | Lee | ......................... H04L 25/00 |
| 2022/0286259 A1* | 9/2022 | Liu | ...................... H04L 5/0048 |
| 2023/0009137 A1* | 1/2023 | Sridharan | .......... H04L 25/0384 |
| 2023/0198822 A1 | 6/2023 | Liu et al. | |

OTHER PUBLICATIONS

IEEE P802.11ax ™M/D6.0, Part 11: Wireless LAN Medium Access Control(MAC) and Physical Layer (PHY) Specifications, Amendment 1: Enhancements for High Efficiency WLAN, Nov. 2019, total 780 pages.
IEEE Std 802.11™-2016, IEEE Standard for Information technology Telecommunications and information exchange between systems, Local and metropolitan area networks Specific requirements, Part 11: Wireless LAN Medium Access Control (MAC) and Physical Layer (PHY) Specifications, 3534 pages.
Extended European Search Report issued in EP22794612.6, dated Sep. 16, 2024, 11 pages.

* cited by examiner

DCM: dual carrier modulation   DUP mode: duplication mode
CDF of PAPR: cumulative distribution function of PARP
PAPR: peak to average power rate   dB: decibel

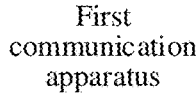

First communication apparatus

Second communication apparatus

S201: Generate a first frequency domain signal, where the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers; a spacing between the first group of subcarriers and the second group of subcarriers is even-numbered subcarriers; and the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data S202: Send the first frequency domain signal S203: Receive a second frequency domain signal, where the second frequency domain signal is obtained after the first frequency domain signal is transmitted through a radio channel S204: Perform preset processing on the second frequency domain signal, to obtain the N pieces of original frequency domain data

FIG. 5

First communication apparatus

Second communication apparatus

S301: Generate a first frequency domain signal, where the first frequency domain signal includes a subsignal obtained by mapping N pieces of first frequency domain data to a first group of subcarriers and a subsignal obtained by sequentially mapping N pieces of second frequency domain data to a second group of subcarriers, a spacing between the first group of subcarriers and the second group of subcarriers is odd-numbered subcarriers, the N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data S302: Send the first frequency domain signal S303: Receive a second frequency domain signal, where the second frequency domain signal is obtained after the first frequency domain signal is transmitted through a radio channel S304: Perform preset processing on the second frequency domain signal, to obtain the N pieces of original frequency domain data

FIG. 6

DCM: dual carrier modulation   DUP mode: duplication mode
CDF of PAPR: cumulative distribution function of PARP
PAPR: peak to average power rate   dB: decibel

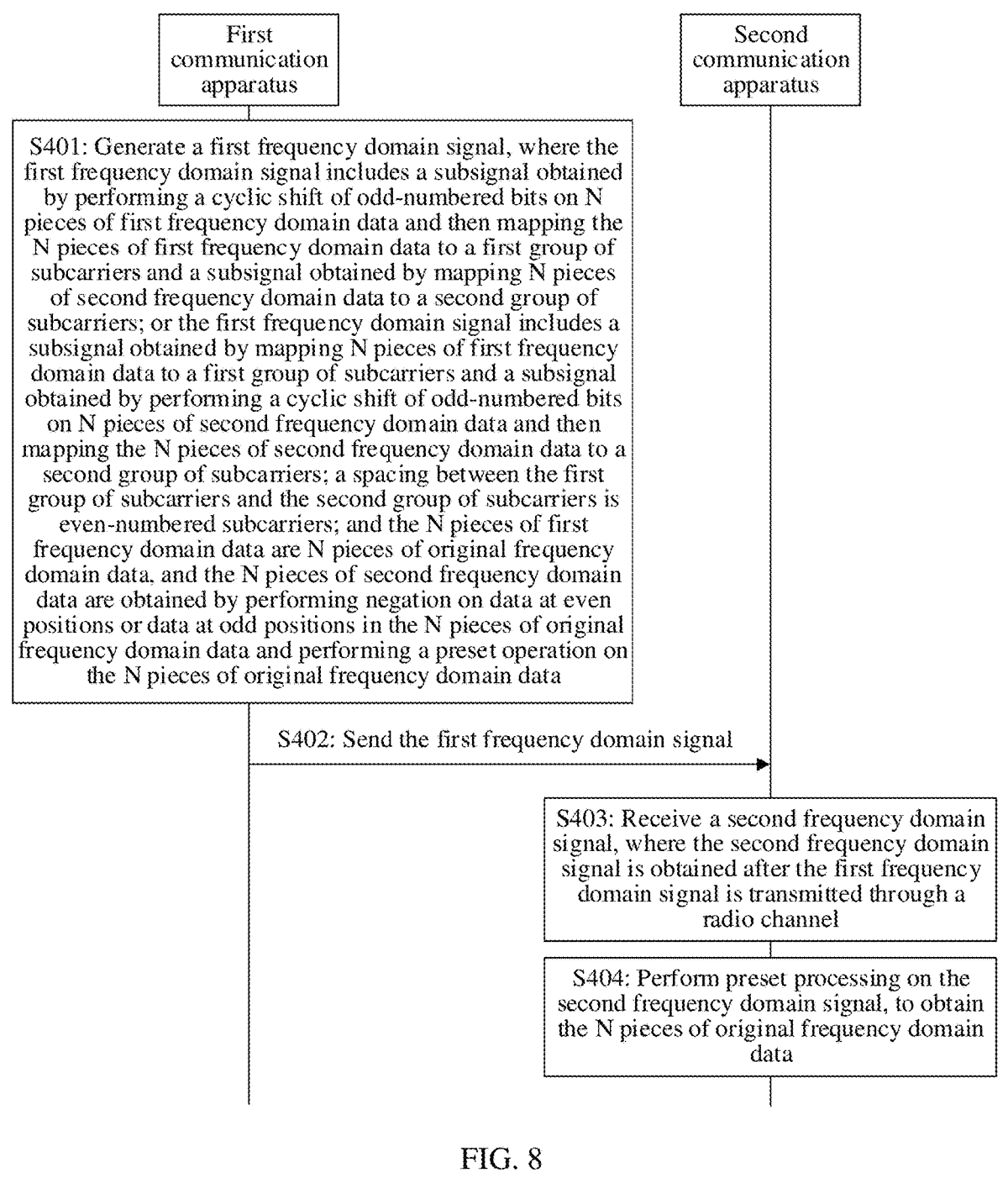

```
┌─────────────────┐                              ┌─────────────────┐
│     First       │                              │     Second      │
│ communication   │                              │ communication   │
│   apparatus     │                              │   apparatus     │
└─────────────────┘                              └─────────────────┘
```

S401: Generate a first frequency domain signal, where the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers; a spacing between the first group of subcarriers and the second group of subcarriers is even-numbered subcarriers; and the N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data S402: Send the first frequency domain signal S403: Receive a second frequency domain signal, where the second frequency domain signal is obtained after the first frequency domain signal is transmitted through a radio channel S404: Perform preset processing on the second frequency domain signal, to obtain the N pieces of original frequency domain data

FIG. 8

COMMUNICATION METHOD IN WIRELESS LOCAL AREA NETWORK AND RELATED APPARATUSES

CROSS-REFERENCE TO RELATED APPLICATIONS

This application is a continuation of International Application No. PCT/CN2022/086830, filed on Apr. 14, 2022, which claims priority to Chinese Patent Application No. 202110455187.4, filed on Apr. 26, 2021. The disclosures of the aforementioned applications are hereby incorporated by reference in their entireties.

TECHNICAL FIELD

The present disclosure relates to the field of wireless communication technologies, and in particular, to a communication method in a wireless local area network and related apparatuses.

BACKGROUND

Orthogonal frequency division multiplexing (OFDM) is a multi-carrier transmission technology. Data is carried by using a large quantity of adjacent orthogonal subcarriers. Each subcarrier is modulated by using a conventional modulation technology, so that the technology has a high-speed transmission capability and can effectively resist frequency selective fading. The OFDM technology has advantages of high spectral efficiency, anti-multipath fading, and the like, but also has a disadvantage of a high peak to average power ratio (PAPR). Accumulation of a plurality of subcarriers in the OFDM generates a large peak signal. Therefore, the OFDM technology requires a high power amplifier to have a large linear dynamic range. This increases costs of the high power amplifier and also reduces efficiency of the high power amplifier. If the peak signal generated by the accumulation of the plurality of subcarriers exceeds a linear dynamic range of the high power amplifier, in-band distortion and out-of-band dispersion are caused. Therefore, reducing the PAPR is a key technology of an OFDM system and has great significance.

The 802.11ax standard (also referred to as a high efficient (HE) standard) introduces a dual carrier modulation (DCM) technology to improve an anti-interference capability. However, in the 802.11ax, a DCM mechanism is usually used together with an orthogonal frequency division multiple access (OFDMA) technology. If the DCM is used, it indicates that a signal rate is reduced, but a transmission distance is longer. In addition, the OFDMA technology is similar to the OFDM technology, and has a disadvantage of a large PAPR. Therefore, the DCM technology also brings a larger PAPR. In the 802.11be standard (also referred to as an extremely high throughput (EHT) standard), to improve a transmission distance and system robustness in a low power indoor (LPI) mode, the 802.11be standard uses a duplication mode (DUP mode). In the DUP mode of the 802.11be, because same information is transmitted in a lower half bandwidth and an upper half bandwidth, data is duplicated in frequency domain to improve system performance. However, the DUP mode also causes a problem of a large PAPR.

Therefore, for the DCM mechanism of the 802.11ax and the DUP mode of the 802.11be, how to reduce the PAPR becomes an urgent problem to be resolved.

SUMMARY

Embodiments of the present disclosure provide a communication method in a wireless local area network and related apparatuses, to reduce a PAPR in a scenario in which data is duplicated in frequency domain (for example, DCM and a DUP mode are used), thereby resolving a problem of a high PAPR caused by frequency domain duplication.

The following describes the present disclosure from different aspects. It should be understood that, for implementations and beneficial effects of the following different aspects, reference may be made to each other.

According to a first aspect, the present disclosure provides a communication method in a wireless local area network. The method includes: A first communication apparatus generates a first frequency domain signal and sends the first frequency domain signal. The first frequency domain signal includes a subsignal obtained by mapping N pieces of first frequency domain data to a first group of subcarriers and a subsignal obtained by mapping N pieces of second frequency domain data to a second group of subcarriers. A spacing between the first group of subcarriers and the second group of subcarriers is odd-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are obtained by performing phase rotation on data at even positions or data at odd positions in N pieces of original frequency domain data. The N pieces of second frequency domain data are obtained by performing a preset operation on the N pieces of first frequency domain data. All the N pieces of original frequency domain data are real numbers. N is an integer greater than 1. The preset operation is reverse arrangement and/or negation.

It can be learned that, in this solution, for a scenario in which data is duplicated in frequency domain (for example, DCM and a DUP mode are used), 2N pieces of new frequency domain data (that is, the N pieces of first frequency domain data and the N pieces of second frequency domain data) are obtained by performing a series of operations such as phase rotation, reverse arrangement, and negation on original frequency domain data, and then the 2N pieces of new frequency domain data are respectively mapped to 2N subcarriers for transmission, so that a PAPR can be reduced, and PAPR distribution after frequency domain duplication is basically consistent with PAPR distribution before the frequency domain duplication, thereby resolving a problem of a high PAPR caused by the frequency domain duplication. In addition, because the original frequency domain data is a real number, a part of the original frequency domain data is multiplied by i or −i, so that the part of the original frequency domain data is changed to a complex number. Therefore, when the original frequency domain data is transmitted through a radio frequency circuit, diversity gains of an I path and a Q path (the I path and the Q path represent two orthogonal paths of an analog signal and respectively represent a real part and an imaginary part of a complex symbol, and generally the real part is referred to as the I path and the imaginary part is referred to as the Q path) can be fully used, thereby improving system performance.

With reference to the first aspect, in a possible implementation, an angle of the phase rotation is any one of the following angles: 90°, −90°, and 180°.

According to a second aspect, the present disclosure provides a communication method in a wireless local area network. The method includes: A second communication apparatus receives a second frequency domain signal, and then performs preset processing on the second frequency domain signal, to obtain N pieces of original frequency domain data. The second frequency domain signal is obtained after a first frequency domain signal is transmitted through a radio channel, and the first frequency domain signal includes a subsignal obtained by mapping N pieces of first frequency domain data to a first group of subcarriers and a subsignal obtained by mapping N pieces of second frequency domain data to a second group of subcarriers. A spacing between the first group of subcarriers and the second group of subcarriers is odd-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are obtained by performing phase rotation on data at even positions or data at odd positions in the N pieces of original frequency domain data. The N pieces of second frequency domain data are obtained by performing a preset operation on the N pieces of first frequency domain data. N is an integer greater than 1.

It should be understood that a transmit end (that is, the first communication apparatus) performs a specific operation when generating the first frequency domain signal, and a receive end (that is, the second communication apparatus) correspondingly performs an inverse operation of the operation, to restore the original frequency domain data.

With reference to the second aspect, in a possible implementation, that the second communication apparatus performs preset processing on the second frequency domain signal, to obtain the N pieces of original frequency domain data includes: The second communication apparatus performs reverse phase rotation on data on subcarriers at even positions or data on subcarriers at odd positions in the first group of subcarriers, to obtain the N pieces of original frequency domain data.

With reference to the second aspect, in a possible implementation, that the second communication apparatus performs preset processing on the second frequency domain signal, to obtain the N pieces of original frequency domain data includes: The second communication apparatus performs an inverse operation of the preset operation on data on the second group of subcarriers, to obtain the N pieces of first frequency domain data. Then, the second communication apparatus performs reverse phase rotation on data at even positions or data at odd positions in the N pieces of first frequency domain data, to obtain the N pieces of original frequency domain data.

With reference to the second aspect, in a possible implementation, that the second communication apparatus performs preset processing on the first frequency domain signal, to obtain the N pieces of original frequency domain data includes: The second communication apparatus performs reverse phase rotation on data on subcarriers at even positions or data on subcarriers at odd positions in the first group of subcarriers, to obtain N pieces of first original frequency domain data. The second communication apparatus performs reverse phase rotation on data on subcarriers at even positions or data on subcarriers at odd positions in the second group of subcarriers, and then performs an inverse operation of the preset operation, to obtain N pieces of second original frequency domain data. The second communication apparatus processes the N pieces of first original frequency domain data and the N pieces of second original frequency domain data according to a maximum ratio combining algorithm, to obtain the N piece of original frequency domain data.

With reference to the second aspect, in a possible implementation, an angle of the phase rotation is any one of the following angles: 90°, −90°, and 180°, and an angle of the reverse phase rotation is any one of the following angles: −90°, 90°, and 180°. The preset operation is reverse arrangement and/or negation, and the inverse operation of the preset operation is also the reverse arrangement and/or the negation.

In an implementation of either of the first aspect and the second aspect, the N subcarriers may include one or more of the following subcarriers: a data subcarrier, a pilot subcarrier, and a null subcarrier. N may represent a quantity of subcarriers carried in a frequency band of a preset size, or N represents a quantity of subcarriers included in a resource unit before data is duplicated in frequency domain (or before a DCM and a DUP mode are used). The subcarriers herein include not only the data subcarrier, but also the pilot subcarrier and/or the null subcarrier.

In an implementation of either of the first aspect and the second aspect, the N subcarriers included in the first group of subcarriers and the N subcarriers included in the second group of subcarriers respectively belong to different resource units, and sizes of the two resource units are equal.

In an implementation of either of the first aspect and the second aspect, the N pieces of original frequency domain data include data obtained by performing constellation mapping on one or more pieces of original data (or a bit sequence), and optionally include one or more of one or more ±1 and one or more 0. That is, a quantity of pieces of data obtained by performing constellation mapping on the one or more pieces of original data (or the bit sequence) is less than or equal to N. If there is a pilot subcarrier in a scheduled resource unit of the first communication apparatus, original frequency domain data corresponding to a location of the pilot subcarrier is +1 or −1. If there is a null subcarrier in the scheduled resource unit of the first communication apparatus, original frequency domain data corresponding to a location of the null subcarrier is 0.

In an implementation of either of the first aspect and the second aspect, the N pieces of first frequency domain data are represented as [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. $Y(k) = -X(N-k-1)$ or $Y(k) = X(N-k-1)$, and $0 \le k \le N-1$.

According to a third aspect, the present disclosure provides a communication method in a wireless local area network. The method includes: A first communication apparatus generates a first frequency domain signal and sends the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers. Alternatively, the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are obtained by performing phase rotation on data at even positions or data at odd positions in N pieces of original frequency domain data. The N pieces of second frequency domain data are obtained by performing a preset operation on the N pieces of first frequency domain data. All the N pieces of original frequency domain data are real numbers. N is an integer greater than 1. The preset operation is reverse arrangement and/or negation.

It can be learned that, in this solution, for a scenario in which data is duplicated in frequency domain (for example, DCM and a DUP mode are used), when a spacing between two groups of subcarriers is even-numbered subcarriers, 2N pieces of new frequency domain data (that is, the N pieces of first frequency domain data and the N pieces of second frequency domain data) are obtained by performing a series of operations such as phase rotation, reverse arrangement, and negation are performed on original frequency domain data, and a cyclic shift of odd-numbered bits is performed on either of the N pieces of first frequency domain data and the N pieces of second frequency domain data and then sequential mapping is performed, so that two frequency domain subsequences obtained through mapping are symmetric about a subcarrier. A PAPR can be reduced, and PAPR distribution after frequency domain duplication is basically consistent with PAPR distribution before the frequency domain duplication, thereby resolving a problem of a high PAPR caused by the frequency domain duplication. In addition, because the original frequency domain data is a real number, a part of the original frequency domain data is multiplied by i or −i, so that the part of the original frequency domain data is changed to a complex number. Therefore, when the original frequency domain data is transmitted through a radio frequency circuit, diversity gains of an I path and a Q path can be fully used, thereby improving system performance.

With reference to the third aspect, in a possible implementation, an angle of the phase rotation is any one of the following angles: 90°, −90°, and 180°.

According to a fourth aspect, the present disclosure provides a communication method in a wireless local area network. The method includes: A second communication apparatus receives a second frequency domain signal, and then performs preset processing on the second frequency domain signal, to obtain N pieces of original frequency domain data. The second frequency domain signal is obtained after a first frequency domain signal is transmitted through a radio channel, and the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers. Alternatively, the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are obtained by performing phase rotation on data at even positions or data at odd positions in the N pieces of original frequency domain data. The N pieces of second frequency domain data are obtained by performing a preset operation on the N pieces of first frequency domain data. All the N pieces of original frequency domain data are real numbers. N is an integer greater than 1.

It should be understood that a transmit end (that is, the first communication apparatus) performs a specific operation when generating the first frequency domain signal, and a receive end (that is, the second communication apparatus) correspondingly performs an inverse operation of the operation, to restore the original frequency domain data.

With reference to the fourth aspect, in a possible implementation, that the second communication apparatus performs preset processing on the second frequency domain signal, to obtain the N pieces of original frequency domain data includes: The second communication apparatus performs a cyclic shift of odd-numbered bits on data on the first group of subcarriers and then performs reverse phase rotation on data on subcarriers at even positions or data on subcarriers at odd positions, to obtain the N pieces of original frequency domain data. The cyclic shift of the odd-numbered bits herein may be a cyclic shift of one bit to the left or a cyclic shift of one bit to the right. Alternatively, the second communication apparatus performs reverse phase rotation on data on subcarriers at even positions or data on subcarriers at odd positions in the first group of subcarriers, to obtain the N pieces of original frequency domain data.

With reference to the fourth aspect, in a possible implementation, that the second communication apparatus performs preset processing on the second frequency domain signal, to obtain the N pieces of original frequency domain data includes: The second communication apparatus performs an inverse operation of the preset operation on data on the second group of subcarriers, to obtain the N pieces of first frequency domain data; and then the second communication apparatus performs reverse phase rotation on data at even positions or data at odd positions in the N pieces of first frequency domain data, to obtain the N pieces of original frequency domain data. Alternatively, the second communication apparatus performs a cyclic shift of odd-numbered bits on data on the second group of subcarriers and then performs an inverse operation of the preset operation, to obtain the N pieces of first frequency domain data; and then the second communication apparatus performs reverse phase rotation on data at even positions or data at odd positions in the N pieces of first frequency domain data, to obtain the N pieces of original frequency domain data.

With reference to the fourth aspect, in a possible implementation, that the second communication apparatus performs preset processing on the first frequency domain signal, to obtain the N pieces of original frequency domain data includes: The second communication apparatus performs a cyclic shift of odd-numbered bits on data on the first group of subcarriers and then performs reverse phase rotation on data on subcarriers at even positions or data on subcarriers at odd positions, to obtain N pieces of first original frequency domain data; and the second communication apparatus performs an inverse operation of the preset operation on data on the second group of subcarriers, to obtain the N pieces of first frequency domain data, and then performs reverse phase rotation on data at even positions or data at odd positions in the N pieces of first frequency domain data, to obtain N pieces of second original frequency domain data. The second communication apparatus processes the N pieces of first original frequency domain data and the N pieces of second original frequency domain data according to a maximum ratio combining algorithm, to obtain the N piece of original frequency domain data. Alternatively, the second communication apparatus performs reverse phase rotation on data on subcarriers at even positions or data on subcarriers at odd positions in the first group of subcarriers, to obtain N pieces of second original frequency domain data; the second communication apparatus performs a cyclic shift of odd-numbered bits on data on the second group of subcarriers, and then performs an inverse operation of the preset operation, to obtain the N pieces of first frequency domain data; the second communication apparatus performs reverse phase rotation on data at even positions or data at odd positions in the N pieces of first frequency domain data, to obtain N pieces of second original frequency domain data; and the second communication apparatus processes the N pieces of first original frequency domain data and the N pieces of second original frequency domain data according to a maximum ratio combining algorithm, to obtain the N pieces of original frequency domain data.

With reference to the fourth aspect, in a possible implementation, an angle of the phase rotation is any one of the following angles: 90°, −90°, and 180°, and an angle of the reverse phase rotation is any one of the following angles: −90°, 90°, and 180°. The preset operation is reverse arrangement and/or negation, and the inverse operation of the preset operation is also the reverse arrangement and/or the negation.

In an implementation of either of the third aspect and the fourth aspect, the N subcarriers may include one or more of the following subcarriers: a data subcarrier, a pilot subcarrier, and a null subcarrier. N may represent a quantity of subcarriers carried in a frequency band of a preset size, or N represents a quantity of subcarriers included in a resource unit before data is duplicated frequency domain (or before DCM and a DUP mode are used). The subcarriers herein include not only the data subcarrier, but also the pilot subcarrier and/or the null subcarrier.

In an implementation of either of the third aspect and the fourth aspect, the N subcarriers included in the first group of subcarriers and the N subcarriers included in the second group of subcarriers respectively belong to different resource units, and sizes of the two resource units are equal.

In an implementation of either of the third aspect and the fourth aspect, the N pieces of original frequency domain data include data obtained by performing constellation mapping on one or more pieces of original data (or a bit sequence), and optionally include one or more of one or more ±1 and one or more 0. That is, a quantity of pieces of data obtained by performing constellation mapping on the one or more pieces of original data (or the bit sequence) is less than or equal to N. If there is a pilot subcarrier in a scheduled resource unit of the first communication apparatus, original frequency domain data corresponding to a location of the pilot subcarrier is +1 or −1. If there is a null subcarrier in the scheduled resource unit of the first communication apparatus, original frequency domain data corresponding to a location of the null subcarrier is 0.

In an implementation of either of the third aspect or the fourth aspect, the cyclic shift of the odd-numbered bits is a cyclic shift of one bit to the left or a cyclic shift of one bit to the right. The N pieces of first frequency domain data are represented [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. [X(1), X(2), . . . , X(N−1), X(0)] is obtained by performing a cyclic shift of one bit to the left on the N pieces of first frequency domain data, and [X(N−1), X(0), X(1), X(2), . . . , X(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N−1), Y(0), Y(1), Y(2), . . . , Y(N−2)] is obtained by performing a cyclic shift of one bit to the right on the N pieces of second frequency domain data. $Y(k)=-X(N-k-1)$ or $Y(k)=X(N-k-1)$, and $0 \leq k \leq N-1$.

According to a fifth aspect, the present disclosure provides a communication method in a wireless local area network. The method includes: A first communication apparatus generates a first frequency domain signal and sends the first frequency domain signal. The first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1. The preset operation includes one or more of conjugation and reverse arrangement.

It can be learned that in this solution, for a scenario in which data is duplicated in frequency domain (for example, DCM and a DUP mode are used), when original frequency domain data includes a complex number, N pieces of new frequency domain data (that is, the N pieces of second frequency domain data) are obtained by performing a series of operations such as conjugation and reverse arrangement on the N pieces of original frequency domain data and negation on data at even positions or data at odd positions, then the N pieces of original frequency domain data (that is, the N pieces of first frequency domain data) and the N pieces of new frequency domain data are respectively mapped to two group of evenly spaced subcarriers, and finally IDFT transform is performed on generated data of a complete bandwidth to time domain and then the data is transmitted through a radio frequency module. Because the newly generated frequency domain data (that is, the second frequency domain data) in a half bandwidth is no longer a simple duplication of the frequency domain data (that is, the first frequency domain data) in the other half bandwidth, a PAPR of a signal in the entire bandwidth is reduced. Therefore, in this solution, a PAPR can be reduced, so that PAPR distribution after frequency domain duplication is basically consistent with PAPR distribution before the frequency domain duplication, thereby resolving a problem of a high PAPR caused by the frequency domain duplication.

According to a sixth aspect, the present disclosure provides a communication method in a wireless local area network. The method includes: A second communication apparatus receives a second frequency domain signal, and then performs preset processing on the second frequency domain signal, to obtain N pieces of original frequency domain data. The second frequency domain signal is obtained after a first frequency domain signal is transmitted through a radio channel, and the first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are the N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1.

With reference to the sixth aspect, in a possible implementation, that the second communication apparatus performs preset processing on the second frequency domain signal, to obtain the N pieces of original frequency domain data includes: The second communication apparatus obtains the N pieces of original frequency domain data carried on the first group of subcarriers.

With reference to the sixth aspect, in a possible implementation, that the second communication apparatus performs preset processing on the second frequency domain signal, to obtain the N pieces of original frequency domain data includes: The second communication apparatus performs negation (multiplied by −1) on data on subcarriers at even positions or data on subcarriers at odd positions in the second group of subcarriers and then performs an inverse operation of the preset operation, to obtain the N pieces of original frequency domain data.

With reference to the sixth aspect, in a possible implementation, that the second communication apparatus performs preset processing on the second frequency domain signal, to obtain the N pieces of original frequency domain data includes: The second communication apparatus obtains N pieces of first original frequency domain data on the first group of subcarriers. The second communication apparatus performs negation (multiplied by −1) on data on subcarriers at even positions or data on subcarriers at odd positions in the second group of subcarriers, and then performs an inverse operation of the preset operation, to obtain N pieces of second original frequency domain data. The second communication apparatus processes the N pieces of first original frequency domain data and the N pieces of second original frequency domain data according to a maximum ratio combining algorithm, to obtain the N piece of original frequency domain data.

With reference to the sixth aspect, in a possible implementation, the preset operation includes one or more of conjugation and reverse arrangement, and the inverse operation of the preset operation also includes one or more of the conjugation and the reverse arrangement.

In an implementation of either of the fifth aspect and the sixth aspect, there is a complex number in the N pieces of original frequency domain data. It should be understood that the complex number in this specification is a generalized complex number, that is, both a real number and a pure imaginary number are understood as special complex numbers. The real number is a complex number without an imaginary part, and the pure imaginary number is a complex number without a real part.

In an implementation of either of the fifth aspect and the sixth aspect, the N subcarriers may include one or more of the following subcarriers: a data subcarrier, a pilot subcarrier, and a null subcarrier. N may represent a quantity of subcarriers carried in a frequency band of a preset size, or N represents a quantity of subcarriers included in a resource unit before data is duplicated in frequency domain (or before DCM and a DUP mode are used). The subcarriers herein include not only the data subcarrier, but also the pilot subcarrier and/or the null subcarrier.

In an implementation of either of the fifth aspect and the sixth aspect, the N subcarriers included in the first group of subcarriers and the N subcarriers included in the second group of subcarriers respectively belong to different resource units, and sizes of the two resource units are equal.

In an implementation of either of the fifth aspect and the sixth aspect, the N pieces of original frequency domain data include data obtained by performing constellation mapping on one or more pieces of original data (or a bit sequence), and optionally include one or more of one or more ±1 and one or more 0. That is, a quantity of pieces of data obtained by performing constellation mapping on the one or more pieces of original data (or the bit sequence) is less than or equal to N. If there is a pilot subcarrier in a scheduled resource unit of the first communication apparatus, original frequency domain data corresponding to a location of the pilot subcarrier is +1 or −1. If there is a null subcarrier in the scheduled resource unit of the first communication apparatus, original frequency domain data corresponding to a location of the null subcarrier is 0.

In an implementation of either of the fifth aspect and the sixth aspect, the N pieces of original frequency domain data are represented as [D(0), D(1), D(2), . . . , D(N−1)], where D( ) represents the original frequency domain data, and the N pieces of first frequency domain data are represented as [D(0), D(1), D(2), . . . , D(N−1)]. The N pieces of second frequency domain data are represented as [Y(0), Y(1), Y(2), . . . , Y(N−1)], where Y( ) represents the second frequency domain data.

$$Y(k) \begin{cases} conj(D(N-k-1)) \times (-1)^k \\ conj(D(N-k-1)) \times (-1)^{k+1} \end{cases},$$

where $0 \le k \le N-1$, and conj( ) represents conjugation.

According to a seventh aspect, the present disclosure provides a communication method in a wireless local area network. The method includes: A first communication apparatus generates a first frequency domain signal and sends the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers. Alternatively, the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1. The preset operation includes one or more of conjugation and reverse arrangement.

It can be learned that in this solution, for a scenario in which data is duplicated in frequency domain (for example, DCM and a DUP mode are used), a PAPR can be reduced, and PAPR distribution after frequency domain duplication is basically consistent with PAPR distribution before the frequency domain duplication, thereby resolving a problem of a high PAPR caused by the frequency domain duplication.

According to an eighth aspect, the present disclosure provides a communication method in a wireless local area network. The method includes: A second communication apparatus receives a second frequency domain signal, and then performs preset processing on the second frequency domain signal, to obtain N pieces of original frequency domain data. The second frequency domain signal is obtained after a first frequency domain signal is transmitted through a radio channel, and the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers. Alternatively, the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are the N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1.

With reference to the eighth aspect, in a possible implementation, that the second communication apparatus performs preset processing on the second frequency domain signal, to obtain the N pieces of original frequency domain data includes: The second communication apparatus performs a cyclic shift of odd-numbered bits on data on the first group of subcarriers, to obtain the N pieces of original frequency domain data. Alternatively, the second communication apparatus obtains the N pieces of original frequency domain data carried on the first group of subcarriers.

With reference to the eighth aspect, in a possible implementation, that the second communication apparatus performs preset processing on the second frequency domain signal, to obtain the N pieces of original frequency domain data includes: The second communication apparatus performs negation (multiplied by −1) on data on subcarriers at even positions or data on subcarriers at odd positions in the second group of subcarriers and then performs an inverse operation of the preset operation, to obtain the N pieces of original frequency domain data. Alternatively, the second communication apparatus performs a cyclic shift of odd-numbered bits on data on the second group of subcarriers, then performs negation (multiplied by −1) on data on subcarriers at even positions or data on subcarriers at odd positions, and then performs an inverse operation of the preset operation, to obtain the N pieces of original frequency domain data.

With reference to the eighth aspect, in a possible implementation, that the second communication apparatus performs preset processing on the second frequency domain signal, to obtain the N pieces of original frequency domain data includes: The second communication apparatus performs a cyclic shift of odd-numbered bits on data on the first group of subcarriers, to obtain N pieces of first original frequency domain data; the second communication apparatus performs negation (multiplied by −1) on data on subcarriers at even positions or data on subcarriers at odd positions in the second group of subcarriers, and then performs an inverse operation of the preset operation, to obtain N pieces of second original frequency domain data; and the second communication apparatus processes the N pieces of first original frequency domain data and the N pieces of second original frequency domain data according to a maximum ratio combining algorithm, to obtain the N piece of original frequency domain data. Alternatively, the second communication apparatus obtains N pieces of first original frequency domain data carried on the first group of subcarriers; the second communication apparatus performs a cyclic shift of odd-numbered bits on data on the second group of subcarriers, performs negation (multiplied by −1) on data on subcarriers at even positions or data on subcarriers at odd positions, and then performs an inverse operation of the preset operation, to obtain N pieces of second original frequency domain data; and the second communication apparatus processes the N pieces of first original frequency domain data and the N pieces of second original frequency domain data according to a maximum ratio combining algorithm, to obtain the N piece of original frequency domain data.

With reference to the eighth aspect, in a possible implementation, the preset operation includes one or more of conjugation and reverse arrangement, and the inverse operation of the preset operation also includes one or more of the conjugation and the reverse arrangement.

In an implementation of either of the seventh aspect and the eighth aspect, the N subcarriers may include one or more of the following subcarriers: a data subcarrier, a pilot subcarrier, and a null subcarrier. N may represent a quantity of subcarriers carried in a frequency band of a preset size, or N represents a quantity of subcarriers included in a resource unit before data is duplicated in frequency domain (or before DCM and a DUP mode are used). The subcarriers herein include not only the data subcarrier, but also the pilot subcarrier and/or the null subcarrier.

In an implementation of either of the seventh aspect and the eighth aspect, the N subcarriers included in the first group of subcarriers and the N subcarriers included in the second group of subcarriers respectively belong to different resource units, and sizes of the two resource units are equal.

In an implementation of either of the seventh aspect and the eighth aspect, the N pieces of original frequency domain data include data obtained by performing constellation mapping on one or more pieces of original data (or a bit sequence), and optionally include one or more of one or more $\pm 1$ and one or more 0. That is, a quantity of pieces of data obtained by performing constellation mapping on the one or more pieces of original data (or the bit sequence) is less than or equal to N. If there is a pilot subcarrier in a scheduled resource unit of the first communication apparatus, original frequency domain data corresponding to a location of the pilot subcarrier is +1 or −1. If there is a null subcarrier in the scheduled resource unit of the first communication apparatus, original frequency domain data corresponding to a location of the null subcarrier is 0.

In an implementation of either of the seventh aspect and the eighth aspect, the cyclic shift of odd-numbered bits is a cyclic shift of one bit to the left or to the right, the N pieces of original frequency domain data are [D(0), D(1), D(2), . . . , D(N−1)], and the N pieces of second frequency domain data are [Y(0), Y(1), Y(2), . . . , Y(N−1)], where D( ) represents the original frequency domain data, and Y( ) represents the second frequency domain data. [D(1), D(2), . . . , D(N−1), D(0)] is obtained by performing a cyclic shift of one bit to the left on the N pieces of first frequency domain data, and [D(N−1), D(0), D(1), D(2), . . . , D(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N−1), Y(0), Y(1), Y(2), . . . , Y(N−2)] is obtained by performing a cyclic shift of one bit to the right on the N pieces of second frequency domain data.

$$Y(k) \begin{cases} conj(D(N-k-1)) \times (-1)^k \\ conj(D(N-k-1)) \times (-1)^{k+1} \end{cases},$$

where $0 \leq k \leq N-1$, and conj( ) represents conjugation.

According to a ninth aspect, the present disclosure provides a first communication apparatus, including a unit or a module configured to perform any one of the first aspect, the third aspect, the fifth aspect, and the seventh aspect.

According to a tenth aspect, the present disclosure provides a second communication apparatus, including a unit or a module configured to perform any one of the second aspect, the fourth aspect, the sixth aspect, and the eighth aspect.

According to an eleventh aspect, the present disclosure provides a first communication apparatus, including a processor and a transceiver that is internally connected to and communicates with the processor.

In a possible implementation, the processor is configured to generate a first frequency domain signal; and the transceiver is configured to send the first frequency domain signal. The first frequency domain signal includes a subsignal obtained by mapping N pieces of first frequency domain data to a first group of subcarriers and a subsignal obtained by mapping N pieces of second frequency domain data to a second group of subcarriers, and a spacing between the first group of subcarriers and the second group of subcarriers is odd-numbered subcarriers. The N pieces of first frequency domain data are obtained by performing phase rotation on data at even positions or data at odd positions in N pieces of original frequency domain data, the N pieces of second frequency domain data are obtained by performing a preset operation on the N pieces of first frequency domain data, and all the N pieces of original frequency domain data are real numbers. N is an integer greater than 1. The first communication apparatus may further include a memory. The memory is configured to be coupled to the processor, and stores program instructions and data that are necessary for the first communication apparatus.

In a possible implementation, the processor is configured to generate a first frequency domain signal; and the transceiver is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are obtained by performing phase rotation on data at even positions or data at odd positions in N pieces of original frequency domain data. The N pieces of second frequency domain data are obtained by performing a preset operation on the N pieces of first frequency domain data. N is an integer greater than 1. All the N pieces of original frequency domain data are real numbers. The first communication apparatus may further include a memory. The memory is configured to be coupled to the processor, and stores program instructions and data that are necessary for the first communication apparatus.

In a possible implementation, the processor is configured to generate a first frequency domain signal; and the transceiver is configured to send the first frequency domain signal. The first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The N pieces of first frequency domain data are N pieces of original frequency domain data. The N pieces of second frequency domain data are obtained by performing negation on data at even positions or data at odd positions in the N pieces of original frequency domain data and performing a preset operation on the N pieces of original frequency domain data. N is an integer greater than 1. The first communication apparatus may further include a memory. The memory is configured to be coupled to the processor, and stores program instructions and data that are necessary for the first communication apparatus.

In a possible implementation, the processor is configured to generate a first frequency domain signal; and the transceiver is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are N pieces of original frequency domain data. The N pieces of second frequency domain data are obtained by performing negation on data at even positions or data at odd positions in the N pieces of original frequency domain data and performing a preset operation on the N pieces of original frequency domain data. N is an integer greater than 1. The first communication apparatus may further include a memory. The memory is configured to be coupled to the processor, and stores program instructions and data that are necessary for the first communication apparatus.

According to a twelfth aspect, the present disclosure provides a second communication apparatus, including a processor and a transceiver that is internally connected to and communicates with the processor.

In a possible implementation, the transceiver is configured to receive a second frequency domain signal; and the processor is further configured to perform preset processing on the second frequency domain signal, to obtain N pieces of original frequency domain data. Optionally, the processor is specifically configured to perform reverse phase rotation on data on subcarriers at even positions or data on subcarriers at odd positions in a first group of subcarriers, to obtain the N pieces of original frequency domain data. The second communication apparatus may further include a memory. The memory is configured to be coupled to the processor, and stores program instructions and data that are necessary for the second communication apparatus.

Optionally, the processor is specifically configured to perform an inverse operation of the preset operation on data on a second group of subcarriers, to obtain N pieces of first frequency domain data; and then perform reverse phase rotation on data at even positions or data at odd positions in the N pieces of first frequency domain data, to obtain the N pieces of original frequency domain data.

Optionally, the processor is specifically configured to: perform reverse phase rotation on data on subcarriers at even positions or data on subcarriers at odd positions in the first group of subcarriers, to obtain N pieces of first original frequency domain data; and perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data.

In a possible implementation, the transceiver is configured to receive a second frequency domain signal; and the processor is further configured to perform preset processing on the second frequency domain signal, to obtain N pieces of original frequency domain data. The second communication apparatus may further include a memory. The memory is configured to be coupled to the processor, and stores program instructions and data that are necessary for the second communication apparatus.

Optionally, the processor is specifically configured to perform a cyclic shift of odd-numbered bits on data on a first group of subcarriers and then perform reverse phase rotation on data on subcarriers at even positions or data on subcarriers at odd positions, to obtain the N pieces of original frequency domain data. Alternatively, the processor is specifically configured to perform reverse phase rotation on data on subcarriers at even positions or data on subcarriers at odd positions in a first group of subcarriers, to obtain the N pieces of original frequency domain data.

Optionally, the processor is specifically configured to perform an inverse operation of the preset operation on data on a second group of subcarriers, to obtain N pieces of first frequency domain data. Alternatively, the processor is further configured to perform a cyclic shift of odd-numbered bits on data on a second group of subcarriers and then perform an inverse operation of the preset operation, to obtain N pieces of first frequency domain data; and then perform reverse phase rotation on data at even positions or data at odd positions in the N pieces of first frequency domain data, to obtain the N pieces of original frequency domain data.

Optionally, the processor is specifically configured to perform a cyclic shift of odd-numbered bits on data on the first group of subcarriers and then perform reverse phase rotation on data on subcarriers at even positions or data on subcarriers at odd positions, to obtain N pieces of first original frequency domain data; and perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data. Alternatively, the processor is specifically configured to perform reverse phase rotation on data on subcarriers at even positions or data on subcarriers at odd positions in the first group of subcarriers, to obtain N pieces of first original frequency domain data; perform a cyclic shift of odd-numbered bits on data on the second group of subcarriers, and then performs an inverse operation of the preset operation, to obtain the N pieces of first frequency domain data; perform reverse phase rotation on data at even positions or data at odd positions in the N pieces of first frequency domain data, to obtain N pieces of second original frequency domain data; and process the N pieces of first original frequency domain data and the N pieces of second original frequency domain data according to a maximum ratio combining algorithm, to obtain the N pieces of original frequency domain data.

In a possible implementation, the transceiver is configured to receive a second frequency domain signal; and the processor is further configured to perform preset processing on the second frequency domain signal, to obtain N pieces of original frequency domain data. The second communication apparatus may further include a memory. The memory is configured to be coupled to the processor, and stores program instructions and data that are necessary for the second communication apparatus.

Optionally, the processor is specifically configured to obtain the N pieces of original frequency domain data carried on a first group of subcarriers.

Optionally, the processor is specifically configured to perform negation (multiplied by −1) on data on subcarriers at even positions or data on subcarriers at odd positions in a second group of subcarriers, and then perform an inverse operation of the preset operation, to obtain the N pieces of original frequency domain data.

Optionally, the processor is specifically configured to obtain N pieces of first original frequency domain data carried on the first group of subcarriers; perform negation (multiplied by −1) on data on subcarriers at even positions or data on subcarriers at odd positions in the second group of subcarriers, and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

In a possible implementation, the transceiver is configured to receive a second frequency domain signal; and the processor is further configured to perform preset processing on the second frequency domain signal, to obtain N pieces of original frequency domain data. The second communication apparatus may further include a memory. The memory is configured to be coupled to the processor, and stores program instructions and data that are necessary for the second communication apparatus.

Optionally, the processor is specifically configured to perform a cyclic shift of odd-numbered bits on data on a first group of subcarriers, to obtain the N pieces of original frequency domain data. Alternatively, the processor is specifically configured to obtain the N pieces of original frequency domain data carried on a first group of subcarriers.

Optionally, the processor is specifically configured to perform negation (multiplied by −1) on data on subcarriers at even positions or data on subcarriers at odd positions in a second group of subcarriers, and then perform an inverse operation of the preset operation, to obtain the N pieces of original frequency domain data. Alternatively, the processor is specifically configured to perform a cyclic shift of odd-numbered bits on data on a second group of subcarriers, then perform negation (multiplied by −1) on data on subcarriers at even positions or data on subcarriers at odd positions, and then perform an inverse operation of the preset operation, to obtain the N pieces of original frequency domain data.

Optionally, the processor is specifically configured to perform a cyclic shift of odd-numbered bits on data on the first group of subcarriers, to obtain N pieces of first frequency domain data; perform negation (multiplied by −1) on data on subcarriers at even positions or data on subcarriers at odd positions in the second group of subcarriers, and then perform an inverse operation of the preset operation, to obtain N pieces of second frequency domain data; and process the N pieces of first frequency domain data and the N pieces of second frequency domain data according to a maximum ratio combining algorithm, to obtain the N piece of original frequency domain data. Optionally, the processor is specifically configured to obtain N pieces of first original frequency domain data carried on the first group of subcarriers; perform a cyclic shift of odd-numbered bits on data on the second group of subcarriers and then perform negation (multiplied by −1) on data on subcarriers at even positions or data on subcarriers at odd positions, and then perform an inverse operation of the preset operation, to obtain N pieces of second frequency domain data; and process the N pieces of first frequency domain data and the N pieces of second frequency domain data according to a maximum ratio combining algorithm, to obtain the N piece of original frequency domain data.

According to a thirteenth aspect, the present disclosure provides a first communication apparatus. The communication apparatus may exist in a product form of a chip, and a structure of the communication apparatus includes an input/output interface and a processing circuit.

In a possible implementation, the processing circuit is configured to generate a first frequency domain signal; and the input/output interface is configured to send the first frequency domain signal. The first frequency domain signal includes a subsignal obtained by mapping N pieces of first frequency domain data to a first group of subcarriers and a subsignal obtained by mapping N pieces of second frequency domain data to a second group of subcarriers, and a spacing between the first group of subcarriers and the second group of subcarriers is odd-numbered subcarriers. The N pieces of first frequency domain data are obtained by performing phase rotation on data at even positions or data at odd positions in N pieces of original frequency domain data, the N pieces of second frequency domain data are obtained by performing a preset operation on the N pieces of first frequency domain data, and all the N pieces of original frequency domain data are real numbers. N is an integer greater than 1. The first communication apparatus may further include a memory. The memory is configured to be coupled to the processing circuit, and stores program instructions and data that are necessary for the first communication apparatus.

In a possible implementation, the processing circuit is configured to generate a first frequency domain signal; and the input/output interface is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data. N is an integer greater than 1. All the N pieces of original frequency domain data are real numbers. The first communication apparatus may further include a memory. The memory is configured to be coupled to the processing circuit, and stores program instructions and data that are necessary for the first communication apparatus.

In a possible implementation, the processing circuit is configured to generate a first frequency domain signal; and the input/output interface is configured to send the first frequency domain signal. The first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The N pieces of first frequency domain data are N pieces of original frequency domain data. The N pieces of second frequency domain data are obtained by performing negation on data at even positions or data at odd positions in the N pieces of original frequency domain data and performing a preset operation on the N pieces of original frequency domain data. N is an integer greater than 1. The first communication apparatus may further include a memory. The memory is configured to be coupled to the processing circuit, and stores program instructions and data that are necessary for the first communication apparatus.

In a possible implementation, the processing circuit is configured to generate a first frequency domain signal; and the input/output interface is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1. The first communication apparatus may further include a memory. The memory is configured to be coupled to the processing circuit, and stores program instructions and data that are necessary for the first communication apparatus.

According to a fourteenth aspect, the present disclosure provides a second communication apparatus. The communication apparatus may exist in a product form of a chip, and a structure of the communication apparatus includes an input/output interface and a processing circuit.

In a possible implementation, the input/output interface is configured to receive a second frequency domain signal; and the processing circuit is further configured to perform preset processing on the second frequency domain signal, to obtain N pieces of original frequency domain data. Optionally, the processing circuit is specifically configured to perform reverse phase rotation on data on subcarriers at even positions or data on subcarriers at odd positions in a first group of subcarriers, to obtain the N pieces of original frequency domain data. The second communication apparatus may further include a memory. The memory is configured to be coupled to the processing circuit, and stores program instructions and data that are necessary for the second communication apparatus.

Optionally, the processing circuit is specifically configured to perform an inverse operation of the preset operation on data on a second group of subcarriers, to obtain N pieces of first frequency domain data; and then perform reverse phase rotation on data at even positions or data at odd positions in the N pieces of first frequency domain data, to obtain the N pieces of original frequency domain data.

Optionally, the processing circuit is specifically configured to: perform reverse phase rotation on data on subcarriers at even positions or data on subcarriers at odd positions in the first group of subcarriers, to obtain N pieces of first original frequency domain data; and perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data.

In a possible implementation, the input/output interface is configured to receive a second frequency domain signal; and the processing circuit is further configured to perform preset processing on the second frequency domain signal, to obtain N pieces of original frequency domain data. The second communication apparatus may further include a memory. The memory is configured to be coupled to the processing circuit, and stores program instructions and data that are necessary for the second communication apparatus.

Optionally, the processing circuit is specifically configured to perform a cyclic shift of odd-numbered bits on data on a first group of subcarriers and then perform reverse phase rotation on data on subcarriers at even positions or data on subcarriers at odd positions, to obtain the N pieces of original frequency domain data. Alternatively, the processing circuit is specifically configured to perform reverse phase rotation on data on subcarriers at even positions or data on subcarriers at odd positions in a first group of subcarriers, to obtain the N pieces of original frequency domain data.

Optionally, the processing circuit is specifically configured to perform an inverse operation of the preset operation on data on a second group of subcarriers, to obtain N pieces of first frequency domain data. Alternatively, the processing circuit is further configured to perform a cyclic shift of odd-numbered bits on data on a second group of subcarriers and then perform an inverse operation of the preset operation, to obtain N pieces of first frequency domain data; and then perform reverse phase rotation on data at even positions or data at odd positions in the N pieces of first frequency domain data, to obtain the N pieces of original frequency domain data.

Optionally, the processing circuit is specifically configured to perform a cyclic shift of odd-numbered bits on data on the first group of subcarriers and then perform reverse phase rotation on data on subcarriers at even positions or data on subcarriers at odd positions, to obtain N pieces of first original frequency domain data; and perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data. Alternatively, the processing circuit is specifically configured to perform reverse phase rotation on data on subcarriers at even positions or data on subcarriers at odd positions in the first group of subcarriers, to obtain N pieces of first original frequency domain data;

perform a cyclic shift of odd-numbered bits on data on the second group of subcarriers, and then performs an inverse operation of the preset operation, to obtain the N pieces of first frequency domain data; perform reverse phase rotation on data at even positions or data at odd positions in the N pieces of first frequency domain data, to obtain N pieces of second original frequency domain data; and process the N pieces of first original frequency domain data and the N pieces of second original frequency domain data according to a maximum ratio combining algorithm, to obtain the N pieces of original frequency domain data.

In a possible implementation, the input/output interface is configured to receive a second frequency domain signal; and the processing circuit is further configured to perform preset processing on the second frequency domain signal, to obtain N pieces of original frequency domain data. The second communication apparatus may further include a memory. The memory is configured to be coupled to the processing circuit, and stores program instructions and data that are necessary for the second communication apparatus.

Optionally, the processing circuit is specifically configured to obtain N pieces of original frequency domain data carried on a first group of subcarriers.

Optionally, the processing circuit is specifically configured to perform negation (multiplied by −1) on data on subcarriers at even positions or data on subcarriers at odd positions in a second group of subcarriers, and then perform an inverse operation of the preset operation, to obtain the N pieces of original frequency domain data.

Optionally, the processing circuit is specifically configured to obtain N pieces of first original frequency domain data carried on the first group of subcarriers; perform negation (multiplied by −1) on data on subcarriers at even positions or data on subcarriers at odd positions in the second group of subcarriers, and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

In a possible implementation, the input/output interface is configured to receive a second frequency domain signal; and the processing circuit is further configured to perform preset processing on the second frequency domain signal, to obtain N pieces of original frequency domain data. The second communication apparatus may further include a memory. The memory is configured to be coupled to the processing circuit, and stores program instructions and data that are necessary for the second communication apparatus.

Optionally, the processing circuit is specifically configured to perform a cyclic shift of odd-numbered bits on data on a first group of subcarriers, to obtain the N pieces of original frequency domain data. Alternatively, the processing circuit is specifically configured to obtain the N pieces of original frequency domain data carried on a first group of subcarriers.

Optionally, the processing circuit is specifically configured to perform negation (multiplied by −1) on data on subcarriers at even positions or data on subcarriers at odd positions in a second group of subcarriers, and then perform an inverse operation of the preset operation, to obtain the N pieces of original frequency domain data. Alternatively, the processing circuit is specifically configured to perform a cyclic shift of odd-numbered bits on data on a second group of subcarriers, then perform negation (multiplied by −1) on data on subcarriers at even positions or data on subcarriers at odd positions, and then perform an inverse operation of the preset operation, to obtain the N pieces of original frequency domain data.

Optionally, the processing circuit is specifically configured to perform a cyclic shift of odd-numbered bits on data on the first group of subcarriers, to obtain N pieces of first frequency domain data; perform negation (multiplied by −1) on data on subcarriers at even positions or data on subcarriers at odd positions in the second group of subcarriers, and then perform an inverse operation of the preset operation, to obtain N pieces of second frequency domain data; and process the N pieces of first frequency domain data and the N pieces of second frequency domain data according to a maximum ratio combining algorithm, to obtain the N piece of original frequency domain data. Optionally, the processing circuit is specifically configured to obtain N pieces of first original frequency domain data carried on the first group of subcarriers; perform a cyclic shift of odd-numbered bits on data on the second group of subcarriers and then perform negation (multiplied by −1) on data on subcarriers at even positions or data on subcarriers at odd positions, and then perform an inverse operation of the preset operation, to obtain N pieces of second frequency domain data; and process the N pieces of first frequency domain data and the N pieces of second frequency domain data according to a maximum ratio combining algorithm, to obtain the N piece of original frequency domain data.

According to a fifteenth aspect, the present disclosure provides a computer-readable storage medium, where the computer-readable storage medium stores program instructions, and when the program instructions run on a computer, the computer is enabled to perform the method according to any one of the first aspect to the eighth aspect.

According to a sixteenth aspect, the present disclosure provides a computer program product including program instructions. When the program instructions run on a computer, the computer is enabled to perform the method according to any one of the first aspect to the eighth aspect.

According to embodiments of the present disclosure, a PAPR can be reduced in a scenario in which data is duplicated in frequency domain (for example, in a DCM mode and a DUP mode), thereby resolving a problem of a high PAPR caused by frequency domain duplication.

BRIEF DESCRIPTION OF DRAWINGS

To describe technical solutions in embodiments of the present disclosure more clearly, the following briefly describes the accompanying drawings used in describing embodiments.

FIG. 5 is a second schematic flowchart of a communication method in a wireless local area network according to an embodiment of the present disclosure;

FIG. 6 is a third schematic flowchart of a communication method in a wireless local area network according to an embodiment of the present disclosure;

FIG. 8 is a fourth schematic flowchart of a communication method in a wireless local area network according to an embodiment of the present disclosure;

DESCRIPTION OF EMBODIMENTS

Figure 1:
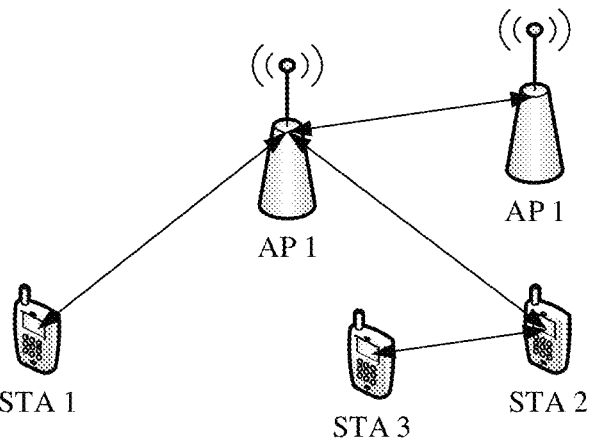
FIG. 1 is a schematic diagram of an architecture of a wireless communication system according to an embodiment of the present disclosure.

The following clearly describes technical solutions in embodiments of the present disclosure with reference to the accompanying drawings in embodiments of the present disclosure.

In the present disclosure, unless otherwise specified, "/" means "or". For example, A/B may indicate A or B. A term "and/or" in this specification describes only an association relationship between associated objects and indicates that there may be one of three relationships. For example, A and/or B may indicate any of the following three cases: Only A exists, both A and B exist, or only B exists. In addition, "at least one" means one or more, and "a plurality of" means two or more. Terms such as "first" and "second" do not limit a quantity and an execution sequence, and the terms such as "first" and "second" do not indicate a definite difference.

In the present disclosure, the term "example" or "for example" is used to represent giving an example, an illustration, or a description. Any embodiment or design scheme described as "example", "such as" or "for example" in the present disclosure should not be explained as being more preferred or having more advantages than another embodiment or design scheme. Exactly, use of the term "example", "in an example", "for example", or the like is intended to present a concept in a specific manner.

For ease of understanding the method provided in embodiments of the present disclosure, the following describes a system architecture of the method provided in embodiments of the present disclosure. It may be understood that the system architecture described in embodiments of the present disclosure is merely intended to describe the technical solutions in embodiments of the present disclosure more clearly, and does not constitute any limitation to the technical solutions provided in embodiments of the present disclosure.

According to the communication method in a wireless local area network provided in this embodiment of the present disclosure, a series of processing is performed on data obtained through constellation mapping, so that PAPR distribution after frequency domain duplication (for example, DCM and a DUP mode are used) is basically consistent with PAPR distribution before the frequency domain duplication, thereby reducing a PAPR and resolving a problem of a high PAPR caused by the frequency domain duplication. The communication method in a wireless local area network may be applied to a wireless communication system, for example, a wireless local area network system. The method may be implemented by a communication device in the wireless communication system or a chip or a processor in a communication device. The communication device may be an access point device or a station device.

The technical solutions provided in the present disclosure may be applied to various communication systems, for example, a system using an 802.11 standard. For example, the 802.11 standard includes, but not limited to, an 802.11ax standard, an 802.11be standard, or a next-generation 802.11 standard. The technical solutions of the present disclosure may be applied to a scenario in which an access point (AP) communicates with one or more stations (STAs), or may be applied to a scenario in which an AP communicates with an AP, or may be applied to a scenario in which a STA communicates with a STA. In embodiments of the present disclosure, the term "communication" may also be described as "data transmission", "information transmission", or "transmission".

FIG. 1 is a schematic diagram of an architecture of a wireless communication system according to an embodiment of the present disclosure. As shown in FIG. 1, the wireless communication system may include one or more APs (for example, an AP 1 or an AP 2 in FIG. 1) and one or more STAs (for example, a STA 1, a STA 2, or a STA 3 in FIG. 1). The AP and the STA support a wireless local area network (WLAN) communication protocol. The communication protocol may include 802.11be (or referred to as a Wi-Fi 7, an EHT protocol), 802.11ax, and may further include a protocol such as 802.11ac. Certainly, with the continuous evolution and development of communication technologies, the communication protocol may further include a next generation protocol of 802.11be, and the like. A WLAN is used as an example, an apparatus for implementing the method in the present disclosure may be an AP or a STA in the WLAN, or a chip or a processing system installed in an AP or a STA.

Optionally, the access point (for example, the AP 1 or the AP 2 in FIG. 1) in the present disclosure is an apparatus having a wireless communication function, supports communication by using a WLAN protocol, has a function of communicating with another device (for example, a station or another access point) in the WLAN, and certainly, may further have a function of communicating with another device. In a WLAN system, the access point may be referred to as an access point station (AP STA). The apparatus having a wireless communication function may be an entire device, or may be a chip or a processing system installed in an entire device, or the like. A device on which the chip or the processing system is installed may implement the method and the function in embodiments of the present disclosure under control of the chip or the processing system. The AP in embodiments of the present disclosure is an apparatus that provides a service for the STA, and may support a series of protocols of 802.11. For example, the AP may be a communication entity such as a communication server, a router, a switch, or a bridge. The AP may include a macro base station, a micro base station, a relay station, and the like in various forms. Certainly, the AP may alternatively be a chip and a processing system in these devices in various forms, to implement the method and the function in embodiments of the present disclosure.

Optionally, the station (for example, the STA 1, the STA 2, or the STA 3 in FIG. 1) in the present disclosure is an apparatus having a wireless communication function, supports communication by using a WLAN protocol, and has a capability of communicating with another station or an access point in the WLAN network. In the WLAN system, the station may be referred to as a non-access point station (non-AP STA). For example, the STA is any user communication device that allows a user to communicate with the AP and further communicate with the WLAN. The apparatus having a wireless communication function may be an entire device, or may be a chip or a processing system installed in an entire device. A device on which the chip or the processing system is installed may implement the method and the function in embodiments of the present disclosure under control of the chip or the processing system. For example, the STA may be user equipment that can be connected to the Internet, for example, a tablet computer, a desktop computer, a laptop computer, a notebook computer, an ultra-mobile personal computer (UMPC), a handheld computer, a net-book, a personal digital assistant (PDA), or a mobile phone. Alternatively, the STA may be an internet of things node in the internet of things, an in-vehicle communication apparatus in the internet of vehicles, an entertainment device, a game device or system, a global positioning system device, or the like. Alternatively, the STA may be a chip and a processing system in the foregoing terminals.

The WLAN system can provide high-speed and low-latency transmission. With the continuous evolution of WLAN application scenarios, the WLAN system is to be applied to more scenarios or industries, for example, the internet of things industry, the internet of vehicles industry, a banking industry, enterprise offices, exhibition halls of stadiums, concert halls, hotel rooms, dormitories, wards, classrooms, supermarkets, squares, streets, production workshops and warehousing. Certainly, a device (for example, an access point or a station) that supports WLAN communication may be a sensor node (for example, a smart water meter, a smart electricity meter, or a smart air detec-tion node) in a smart city, a smart device (for example, a smart camera, a projector, a display screen, a television, a stereo, a refrigerator, or a washing machine) in a smart home, a node in the internet of things, an entertainment terminal (for example, a wearable device such as augmented reality (AR) or virtual reality (VR)), a smart device (for example, a printer, a projector, a speaker, or a stereo) in smart office, an internet of vehicles device in the internet of vehicles, an infrastructure (for example, a vending machine, a self-service navigation console of a supermarket, a self-service cashier, or a self-service ordering machine) in a daily life scenario, a device in a large sports and music venue, and the like. Specific forms of the STA and the AP are not limited in embodiments of the present disclosure, and are merely examples for description herein.

Figure 2A:
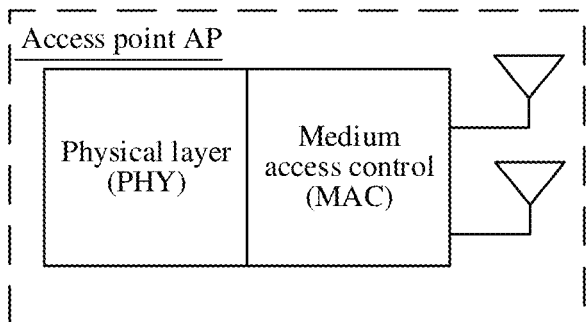
FIG. 2a is a schematic diagram of a structure of an access point according to an embodiment of the present disclosure.
Figure 2B:
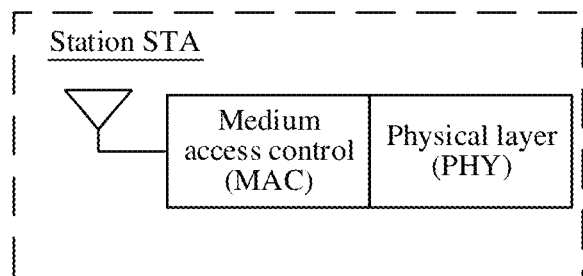
FIG. 2b is a schematic diagram of a structure of a station according to an embodiment of the present disclosure.

It should be understood that the 802.11 standard focuses on a physical (physical layer, PHY) part and a media access control (MAC) layer part. For example, FIG. 2a is a sche-matic diagram of a structure of an access point according to an embodiment of the present disclosure. The AP may be a multi-antenna/multi-radio frequency AP, or may be a single-antenna/single-radio frequency AP. The antenna/radio fre-quency AP is configured to send/receive a data packet. In an implementation, an antenna part or a radio frequency part of the AP may be separated from a main body part of the AP, and is in a remote layout structure. In FIG. 2a, the AP may include a physical layer processing circuit and a media access control processing circuit. The physical layer pro-cessing circuit may be configured to process a physical layer signal, and the MAC layer processing circuit may be con-figured to process a MAC layer signal. For another example, FIG. 2b is a schematic diagram of a structure of station according to an embodiment of the present disclosure. FIG. 2b is a schematic diagram of a structure of a single-antenna/ single-radio-frequency STA. In an actual scenario, the STA may alternatively be a multi-antenna/multi-radio frequency STA, and may be a device with more than two antennas. The antenna/radio frequency STA is configured to send/receive a data packet. In an implementation, an antenna part or a radio frequency part of the STA may be separated from a main body part of the STA, and is in a remote layout structure. In FIG. 2b, the STA may include a PHY processing circuit and a MAC processing circuit. The physical layer processing circuit may be configured to process a physical layer signal, and the MAC layer processing circuit may be configured to process a MAC layer signal.

The system architecture in embodiments of the present disclosure is briefly described in the foregoing content. To better understand the technical solutions in embodiments of the present disclosure, the following briefly describes con-tent related to embodiments of the present disclosure.

1. Peak to Average Power Ratio (PAPA, which is Referred to as a Peak to Average Ratio for Short)

An amplitude of a radio signal changes constantly in time domain. Therefore, a transmit power of the radio signal is not constant. The PAPR is a ratio of a peak power of a signal to an average power of the signal within a period of time. When an OFDM modulation manner is used, X(k) repre-sents a value of a constellation point on a $k^{th}$ subcarrier in frequency domain, and a time domain sign x(n) is repre-sented following formula (1-1):

$$x(n) = \frac{1}{N}\sum_{k}X(k)e^{j\frac{2\pi}{N}kn} \qquad (1\text{-}1)$$

A corresponding PAPR is shown in the following formula (1-2):

$$PAPR = 10 \times \log_{10}\left(\frac{\max|x(n)|^2}{\frac{1}{N}\sum_{n}|x(n)|^2}\right) \qquad (1\text{-}2)$$

Because the modulation data X(k) in frequency domain is a random value, the PAPR is also a random variable. Therefore, a PAPR of a system is generally evaluated by using a cumulative distribution function (CDF) of the PAPR.

2. OFDM Modulation

In a conventional OFDM modulation solution, only data of $N_d$ constellation points needs to be mapped to $N_d$ data subcarriers (data of one constellation point is mapped to one data subcarrier), then the data is converted into a time domain signal through inverse discrete fourier transform (IDFT), and then the time domain signal is sent through a radio frequency module. $N_d$ is a quantity of data subcarriers carried in a given frequency band. In some scenarios, to enhance system performance and increase a transmission distance, the data of the $N_d$ constellation points may be transmitted through more subcarriers, for example, by using $2N_d$ subcarriers. A simplest manner is to map the data of the $N_d$ constellation points to the first $N_d$ subcarriers and the last $N_d$ subcarriers respectively. However, this causes a PAPR value of a finally sent OFDM signal to increase.

3. Dual Carrier Modulation (DCM)

The dual carrier modulation is to modulate same infor-mation on a pair of subcarriers, or repeatedly transmit a signal on two subcarriers simultaneously, which is similar to a subcarrier-based frequency diversity technology. In addi-tion, the dual carrier modulation requires that a distance between two subcarriers that carry the same information (or signal) to be long enough to increase a diversity gain.

In the 802.11ax, when a binary phase shift keying (BPSK) DCM technology is used, each piece of bit information is mapped to a pair of data subcarriers, and locations of the pair (that is, two) of data subcarriers are respectively a $k^{th}$ data subcarrier and a $(k+N_d)^{th}$ data subcarrier. Herein, $N_d$ represents a quantity of data subcarriers included in a resource unit (RU) when no DCM technology is used.

Specifically, in a dual carrier modulation manner, a bit sequence is mapped to a pair of constellation points $(d_k, d_{q(k)})$. $0{\le}k{\le}N_d-1$, and $q(k)=k+N_d$. $N_d$ is a quantity of data subcarriers carried in a given frequency band, or $N_d$ is a quantity of data subcarriers included in a resource unit when no DCM technology is used. The subscript d in $N_d$ represents data, that is, a data subcarrier.

When the BPSK is used, $d_k=1$ or $-1$. To reduce a problem of a high PAPR caused by duplication of frequency domain data, a policy of $d_{q(k)}=d_k*(-1)^k$ is used in the DCM technology. That is, negation is alternately performed on data duplicated in frequency domain, so that modulated data has a low PAPR after being mapped to an OFDM symbol.

However, although the DCM technology avoids, by performing alternating negation on data that is duplicated in frequency domain, a problem of a large PAPR caused by direct duplication, a PAPR after frequency domain duplication is still greatly increased compared with a PAPR before duplication, and the PAPRs before and after the duplication cannot be consistent.

4. Duplication Mode (DUP Mode)

In a DUP mode of 802.11be, same information is transmitted in a lower half bandwidth and an upper half bandwidth, and a value mapped to a subcarrier corresponding to half with a low frequency of the upper half bandwidth is multiplied by $-1$, that is, phase rotation is performed by 180°, to reduce a problem of a high PAPR caused by a frequency domain duplication process (or to reduce a PAPR along with a partial sign change).

In the DUP mode, phase rotation is performed on half of data that is duplicated in frequency domain, to avoid a problem of a large PAPR caused by direct duplication. However, a PAPR after duplication is still greatly increased compared with a PAPR before duplication, and the PAPRs before and after the duplication cannot be consistent.

Therefore, an embodiment of the present disclosure provides a communication method in a wireless local area network. For a scenario in which data is duplicated in frequency domain (for example, DCM and a DUP mode are used), a PAPR can be reduced, and PAPR distribution after frequency domain duplication is basically consistent with PAPR distribution before the frequency domain duplication, thereby resolving a problem of a high PAPR caused by the frequency domain duplication.

The following describes the technical solutions provided in the present disclosure in detail with reference to more accompanying drawings.

The technical solutions provided in the present disclosure are described in detail by using four embodiments. Embodiment 1 describes how to generate a first frequency domain signal to ensure that PAPR distribution after frequency domain duplication is basically consistent with PAPR distribution before the frequency domain duplication when all original frequency domain data obtained by performing modulation (or constellation point mapping) is a real number and a spacing between two groups of subcarriers is odd-numbered subcarriers. Embodiment 2 describes how to generate a first frequency domain signal to ensure that PAPR distribution after frequency domain duplication is basically consistent with PAPR distribution before the frequency domain duplication when all original frequency domain data obtained by performing modulation (or constellation point mapping) is a real number and a spacing between two groups of subcarriers is even-numbered subcarriers. Embodiment 3 describes how to generate a first frequency domain signal to ensure that PAPR distribution after frequency domain duplication is basically consistent with PAPR distribution before the frequency domain duplication when there is a complex number in original frequency domain data obtained by performing modulation (or constellation point mapping) and a spacing between two groups of subcarriers is odd-numbered subcarriers. Embodiment 4 describes how to generate a first frequency domain signal to ensure that PAPR distribution after frequency domain duplication is basically consistent with PAPR distribution before the frequency domain duplication when there is a complex number in original frequency domain data obtained by performing modulation (or constellation point mapping) and a spacing between two groups of subcarriers is even-numbered subcarriers. It should be understood that parts that are related to same or similar concepts or solutions in Embodiment 1 to Embodiment 4 of the present disclosure may be mutually referenced or combined. The following describes each embodiment in detail.

It should be understood that a first communication apparatus mentioned below in the present disclosure may be the AP, or may be the STA, or may be a functional entity or a functional unit in a multi-link device. For example, the first communication apparatus in the present disclosure is an AP in an AP multi-link device, or a STA in a station multi-link device. This is not limited in the present disclosure. The first communication apparatus in the present disclosure supports at least one of the 802.11be protocol and the 802.11ax protocol, and may further support another WLAN communication protocol and a protocol such as 802.11ac. Certainly, with the continuous evolution and development of communication technologies, the first communication apparatus in the present disclosure may further support a next-generation 802.11be protocol and the like.

Embodiment 1

Embodiment 1 of the present disclosure mainly describes how to generate a first frequency domain signal to ensure that PAPR distribution after frequency domain duplication is basically consistent with PAPR distribution before the frequency domain duplication when all original frequency domain data obtained by performing modulation (or constellation point mapping) on a bit sequence is a real number and a spacing between two groups of subcarriers is odd-numbered subcarriers.

Figure 3:
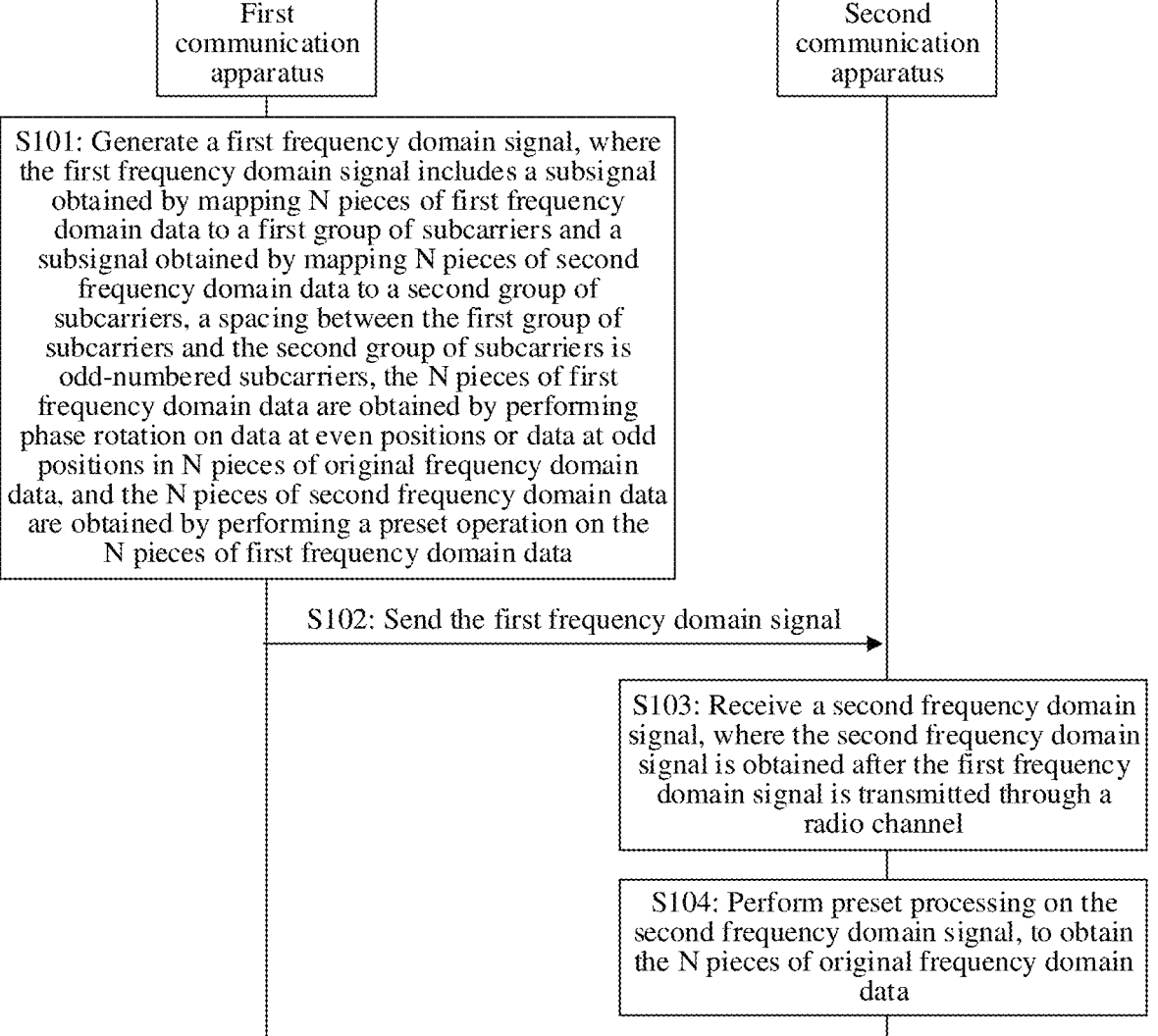
FIG. 3 is a first schematic flowchart of a communication method in a wireless local area network according to an embodiment of the present disclosure.

FIG. 3 is a first schematic flowchart of a communication method in a wireless local area network according to an embodiment of the present disclosure. As shown in FIG. 3, the communication method in a wireless local area network includes, but not limited to, the following steps.

S101: A first communication apparatus generates a first frequency domain signal, where the first frequency domain signal includes a subsignal obtained by mapping N pieces of first frequency domain data to a first group of subcarriers and a subsignal obtained by mapping N pieces of second frequency domain data to a second group of subcarriers, a spacing between the first group of subcarriers and the second group of subcarriers is odd-numbered subcarriers, the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data.

S102: The first communication apparatus sends the first frequency domain signal.

Optionally, an angle of the phase rotation may be any one of 90°, −90°, and 180°. In other words, the phase rotation may be equivalent to multiplying by a coefficient. For example, performing phase rotation by 90° is equivalent to multiplying a pure imaginary number i, performing phase rotation by −90° is equivalent to multiplying a pure imaginary number −i, and performing phase rotation by 180° is equivalent to multiplying −1. The preset operation may include reverse arrangement (that is, head-to-tail reverse) and/or negation (that is, multiplied by −1). Specifically, the first communication apparatus obtains N pieces of original frequency domain data, where all the N pieces of original frequency domain data may be real numbers. N is an integer greater than 1. The N pieces of original frequency domain data include data obtained by performing constellation mapping on one or more pieces of original data (or a bit sequence), and optionally include one or more of one or more ±1 and one or more 0. The first communication apparatus performs phase rotation on data at even positions and keeps data at odd positions unchanged in the N pieces of original frequency domain data, to obtain the N pieces of first frequency domain data. Alternatively, the first communication apparatus performs phase rotation on data at odd positions and keeps data at even positions unchanged in the N pieces of original frequency domain data, to obtain the N pieces of first frequency domain data. Then, the first communication apparatus performs a preset operation (for example, reverse arrangement and/or negation) on the obtained N pieces of first frequency domain data, to obtain the N pieces of second frequency domain data. The first communication apparatus sequentially maps the N pieces of first frequency domain data to the first group of subcarriers, and sequentially maps the N pieces of second frequency domain data to the second group of subcarriers, to obtain the first frequency domain signal. The spacing between the first group of subcarriers and the second group of subcarriers is the odd-numbered subcarriers, and the first group of subcarriers and the second group of subcarriers each include N evenly spaced subcarriers. The N pieces of first frequency domain data and the N pieces of second frequency domain data may be combined into a complete frequency domain sequence, a length of the frequency domain sequence is 2N, and the first frequency domain signal is obtained by mapping the frequency domain sequence whose length is 2N to 2N subcarriers. The first communication apparatus performs IDFT or inverse fast Fourier transform (IFFT) on the first frequency domain signal to convert the first frequency domain signal into a time domain signal, and transmits the time domain signal through a radio frequency circuit.

Optionally, the first group of subcarriers includes N evenly spaced subcarriers, for example, subcarriers in a resource unit (RU), and the second group of subcarriers also includes N evenly spaced subcarriers, for example, subcarriers in another RU. In addition, subcarriers included in the first group of subcarriers do not overlap subcarriers included in the second group of subcarriers. The N subcarriers may include one or more of the following subcarriers: a data subcarrier, a pilot subcarrier, and a null subcarrier. N may represent a quantity of subcarriers carried in a frequency band of a preset size, or N represents a quantity of subcarriers included in a resource unit before data is duplicated in frequency domain (or before DCM and a DUP mode are used). The subcarriers herein include not only the data subcarrier, but also the pilot subcarrier and/or the null subcarrier. For example, an RU 52 is used as an example, and N=52. It can be learned from carrier planning (tone plan) of 802.11be that the evenly spaced 52 subcarriers include 48 data subcarriers and four pilot subcarriers. For another example, an RU 106 is used as an example, and N=106. It can be learned from carrier planning (tone plan) of 802.11be that the evenly spaced 106 subcarriers include 102 data subcarriers and four pilot subcarriers. For another example, an RU 484 is used as an example, and N=484. It can be learned from carrier planning (tone plan) of 802.11be that the evenly spaced 484 subcarriers include 468 data subcarriers, 16 pilot subcarriers, and five null subcarriers (it should be understood that the null subcarriers are also referred to as direct current subcarriers). The subcarriers included in first group of subcarriers and the second group of subcarriers have a same type. For example, if the first group of subcarriers includes a data subcarrier and a pilot subcarrier, the second group of subcarriers also includes a data subcarrier and a pilot subcarrier. If the first group of subcarriers includes a data subcarrier, a pilot subcarrier, and a null subcarrier, the second group of subcarriers also includes a data subcarrier, a pilot subcarrier, and a null subcarrier.

Optionally, the subcarriers included in the first group of subcarriers do not overlap the subcarriers included in the second group of subcarriers, the N subcarriers included in the first group of subcarriers and the N subcarriers included in the second group of subcarriers respectively belong to different resource units, and sizes of the two resource units are equal. For example, the N subcarriers included in the first group of subcarriers belong to an RU 242, and the N subcarriers included in the second group of subcarriers belong to another RU 242.

Optionally, before generating the first frequency domain signal, the first communication apparatus may determine information such as a size and a location of a scheduled resource unit of the first communication apparatus. For example, if the first communication apparatus is a STA, the first communication apparatus may determine, based on an indication of an RU allocation field in a radio frame sent by an AP, information such as a size and a location of a scheduled resource unit of the first communication apparatus. Therefore, the first communication apparatus may construct the N pieces of original frequency domain data based on the information such as the size and the location of the scheduled resource unit of the first communication apparatus and data obtained by performing constellation mapping on a plurality of pieces of original data (or a bit sequence). The N pieces of original frequency domain data include the data obtained by performing constellation mapping on the plurality of pieces of original data (or the bit sequence), and optionally include one or more of one or more ±1 and one or more 0. That is, a quantity of pieces of data obtained by performing constellation mapping on the plurality of pieces of original data (or the bit sequence) is less than or equal to N. If there is a pilot subcarrier in a scheduled resource unit of the first communication apparatus, original frequency domain data corresponding to a location of the pilot subcarrier is +1 or −1. For example, if the scheduled resource unit of the first communication apparatus is two RUs 52, N is equal to 52. It is assumed that a location of one RU 52 is a subcarrier numbered −499 to a subcarrier numbered −448. According to carrier planning (tone plan) of 802.11be, it can be learned that pilot subcarriers in the RU 52 are subcarriers numbered −494, −480, −468, and −454. It can be learned that locations of the four pilot subcarriers numbered −494, −480, −468, and −454 on the RU 52 are respectively a 6th subcarrier, a 20th subcarrier, a 32nd subcarrier, and a 46th subcarrier. Therefore, all 6th original frequency domain data, 20th original frequency domain data, 32nd original frequency domain data, and 46 original frequency domain data in the 52 pieces of original frequency domain data are +1 or −1, or some of 6th original frequency domain data, 20th original frequency domain data, 32nd original frequency domain data, and 46th original frequency domain data in the 52 pieces of original frequency domain data are +1, and some other of the 6th original frequency domain data, the 20th original frequency domain data, the 32nd original frequency domain data, and the 46th original frequency domain data are −1.

Similarly, if there is a null subcarrier in the scheduled resource unit of the first communication apparatus, original frequency domain data corresponding to a location of the null subcarrier is 0. For example, if the scheduled resource unit of the first communication apparatus is two RUs 484, N is equal to 484. It is assumed that numbers of subcarriers of one RU 484 range from −500 to −12, and numbers of five null subcarriers are respectively −258, −257, −256, −255, and −254. Locations of the five null subcarriers numbered −258, −257, −256, −255, and −254 on the RU 484 are respectively a 243rd subcarrier, a 244th subcarrier, a 245th subcarrier, a 246th subcarrier, and a 247th subcarrier. Therefore, all 243rd original frequency domain data, 244th original frequency domain data, 245th original frequency domain data, 246th original frequency domain data, and 247th original frequency domain data in the 484 pieces of original frequency domain data are 0.

To better understand the technical solutions provided in embodiments of the present disclosure, the following describes in detail a manner in which the first communication apparatus generates the first frequency domain signal by using an example in which the angle of the phase rotation is 90° (that is, multiplied by a pure imaginary number i) or −90° (that is, multiplied by a pure imaginary number −i).

Specifically, the first communication apparatus obtains the N pieces of original frequency domain data, where all the N pieces of original frequency domain data are real numbers. N is an integer greater than 1. The N pieces of original frequency domain data include data obtained by performing constellation mapping on one or more pieces of original data (or a bit sequence), and optionally include one or more of one or more ±1 and one or more 0. The first communication apparatus multiplies data at even position by a pure imaginary number i (that is, performs phase rotation by 90°) or a pure imaginary number −i (that is, performs phase rotation by −90°), and keeps data at odd positions unchanged in the N pieces of original frequency domain data, to obtain the N pieces of first frequency domain data after the phase rotation, where data at odd positions in the N pieces of first frequency domain data is the same as the data at the odd positions in the N pieces of original frequency domain data. Alternatively, the first communication apparatus multiplies data at odd position by a pure imaginary number i (that is, performs phase rotation by 90°) or a pure imaginary number −i (that is, performs phase rotation by −90°), and keeps data at even positions unchanged in the N pieces of original frequency domain data, to obtain the N pieces of first frequency domain data after the phase rotation, where data at even positions in the N pieces of first frequency domain data is the same as the data at the even positions in the N pieces of original frequency domain data. The first communication apparatus then performs reverse arrangement (that is, head-to-tail reverse) on the N pieces of first frequency domain data, to obtain the N pieces of second frequency domain data, or the first communication apparatus performs reverse arrangement (that is, head-to-tail reverse) and negation (that is, multiplied by −1) on the N pieces of first frequency domain data, to obtain the N pieces of second frequency domain data. It should be understood that an execution sequence of the reverse arrangement operation and the negation operation is not limited in this embodiment of the present disclosure. The reverse arrangement may be first performed and then the negation is performed, or the negation may be first performed and then the reverse arrangement is performed. The first communication apparatus may sequentially map the N pieces of first frequency domain data to the first group of subcarriers to obtain a subsignal, and then sequentially map the N pieces of second frequency domain data to the second group of subcarriers to obtain another subsignal. A spacing between the first group of subcarriers and the second group of subcarriers is odd-numbered subcarriers, and the two subsignals are symmetric relative to a subcarrier. For example, a subcarrier with a largest number in the first group of subcarriers and a subcarrier with a smallest number in the second group of subcarriers are spaced by one subcarrier, and the two subsignals are symmetric relative to the spaced subcarrier. The two subsignals form a complete first frequency domain signal. The N pieces of first frequency domain data and the N pieces of second frequency domain data may be combined into a complete frequency domain sequence, a length of the frequency domain sequence is 2N, and the first frequency domain signal is obtained by mapping the frequency domain sequence whose length is 2N to 2N subcarriers. The first communication apparatus performs IDFT or IFFT on the first frequency domain signal to convert the first frequency domain signal into a time domain signal, and transmits the time domain signal through a radio frequency circuit.

For example, it is assumed that the N pieces of original frequency domain data are represented as [D(0), D(1), D(2), . . . , D(N−1)], where D(k) represents a random real number, and $0 \le k \le N-1$. D(k) is generated based on transmitted data content. The first communication apparatus first processes the N pieces of original frequency domain data [D(0), D(1), D(2), . . . , D(N−1)], to obtain 2N pieces of new data, and respectively maps the 2N pieces of new data to 2N subcarriers for transmission. Specifically, the first communication apparatus multiplies data at even positions or at odd positions in the N pieces of original frequency domain data [D(0), D(1), D(2), . . . , D(N−1)] by i or −i (that is, performs phase rotation by 90° or −90°), to obtain frequency domain data [X(0), X(1), X(2), . . . , X(N−1)] after the phase rotation, that is, to obtain the N pieces of first frequency domain data after the phase rotation. It should be understood that, because the first communication apparatus performs phase rotation on only the data at the even positions or at the odd positions in [D(0), D(1), D(2), . . . , D(N−1)], the phase rotation is performed on half of the N pieces of first frequency domain data, and a phase of the other half data does not change. The first communication apparatus then performs reverse arrangement (that is, head-to-tail reverse) on the N pieces of first frequency domain data [X(0), X(1), X(2), . . . , X(N−1)] and multiplies the N pieces of first frequency domain data by −1 (that is, negation), to obtain the N pieces of second frequency domain data [Y(0), Y(1), Y(2), . . . , Y(N−1)]. $Y(k) = -X(N-k-1)$ or $Y(k) = X(N-k-1)$, and $0 \le k \le N-1$. In this way, data of 2N constellation points is obtained, that is, $\vec{X} = [X(0), X(1), X(2), . . . , X(N-1)]$ and $\vec{Y}$=[Y(0), Y(1), Y(2), . . . , Y(N−1)]. The first communication apparatus sequentially maps $\vec{X}$ to N evenly spaced subcarriers (that is, the first group of subcarriers) (for example, subcarriers in an RU) and sequentially maps $\vec{Y}$ to N evenly spaced subcarriers (that is, the second group of subcarriers), to obtain the first frequency domain signal. A spacing between the two groups of subcarriers (that is, the first group of subcarriers and the second group of subcarriers) is odd-numbered subcarriers. Then, the first communication apparatus performs IDFT transform on the first frequency domain signal to time domain, and transmits the time domain signal through a radio frequency circuit.

To describe impact of the technical solutions provided in embodiments of the present disclosure on a PAPR, the following describes impact of the technical solutions provided in embodiments of the present disclosure on the PAPR by using a simulation result comparison diagram.

Figure 4:
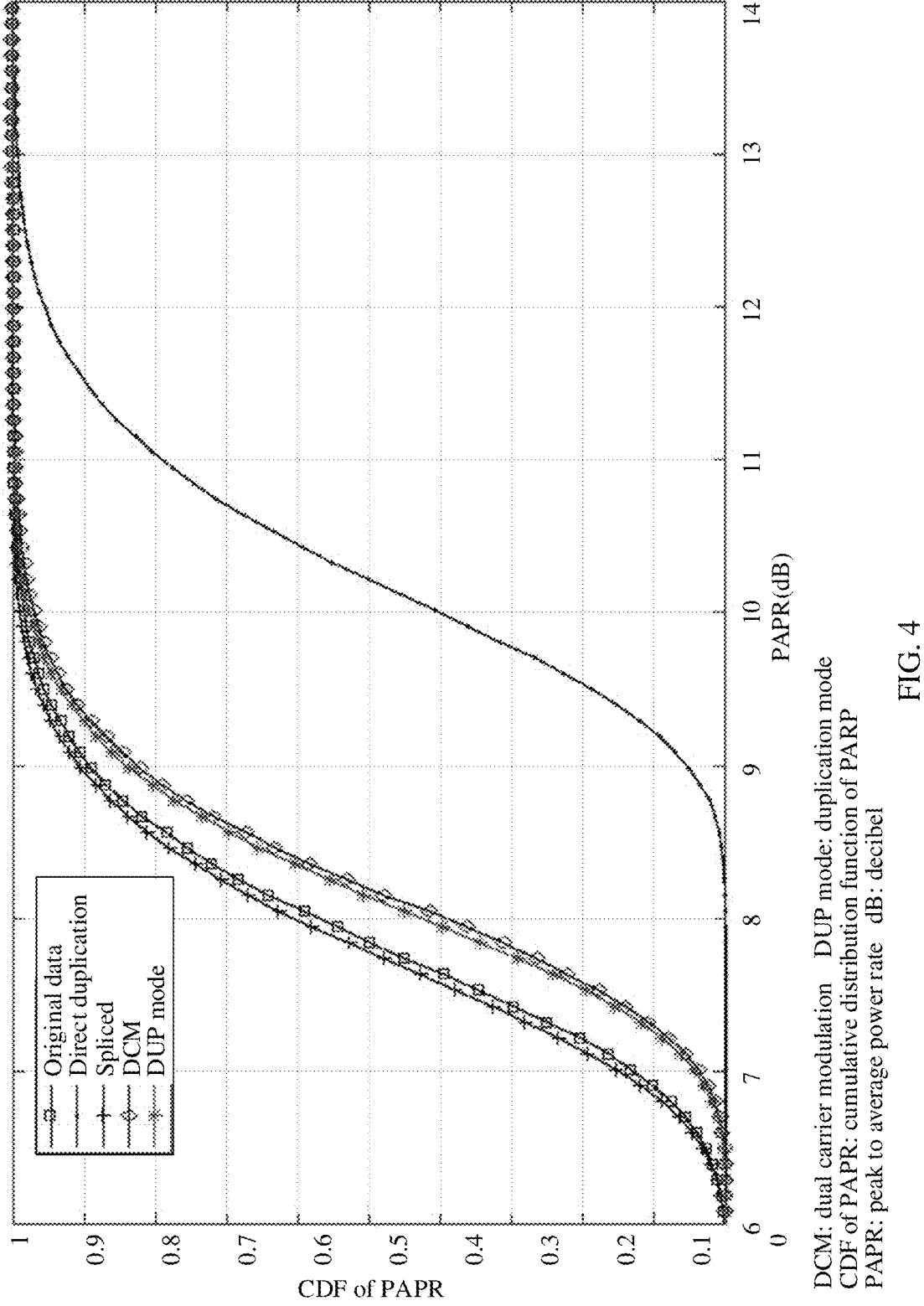
FIG. 4 is a PAPR simulation result comparison diagram according to an embodiment of the present disclosure.

FIG. 4 is a PAPR simulation result comparison diagram according to an embodiment of the present disclosure. A simulation condition in FIG. 4 is as follows: An RU 242 is used as an example, and N=242. If BPSK modulation is used, data obtained by performing BPSK modulation on a plurality of pieces of original data (or a bit sequence) is 1 or −1, and $\vec{X}$=[X(0), X(1), X(2), . . . , X(N−1)] and $\vec{Y}$=[Y(0), Y(1), Y(2), . . . , Y(N−1)] are generated by using the method in the foregoing example. Then, $\vec{X}$ is sequentially mapped to subcarriers in an RU 242, and $\vec{Y}$ is sequentially mapped to subcarriers in another RU 242. There are five subcarriers between the two RUs 242, and the two RUs 242 are spliced together. A PAPR of original data, a PAPR of direct duplication, a spliced PAPR (that is, a PAPR in this embodiment), a PAPR of DCM, and a PAPR in a DUP mode are shown in FIG. 4. In FIG. 4, a horizontal coordinate represents a PAPR value, and a vertical coordinate represents a cumulative distribution function (CDF) of the PAPR. It can be learned from FIG. 4 that, if data is directly duplicated in frequency domain, an average PAPR of the data is increased by 2 dB to 3 dB compared with the PAPR of the original data. For example, the vertical coordinate in FIG. 4 is equal to 0.5, the PAPR of the original data is approximately 7.8 dB, and the PAPR of the data that is directly duplicated in frequency domain is approximately 10.2 dB. It can also be learned from FIG. 4 that the PAPR of the DCM and the PAPR in the DUP mode are reduced to some extent compared with the PAPR of the data that is directly duplicated in frequency domain, but the PAPR of the DCM and the PAPR in the DUP mode are still obviously greater than the PAPR of the original data. However, in this embodiment, distribution of the spliced PAPR may be basically consistent with distribution of the PAPR of the original data.

Therefore, in this embodiment, for a scenario in which data is duplicated in frequency domain (for example, DCM and a DUP mode are used), 2N pieces of new frequency domain data (that is, the N pieces of first frequency domain data and the N pieces of second frequency domain data) are obtained by performing a series of operations such as phase rotation, reverse arrangement, and negation on original frequency domain data, and then the 2N pieces of new frequency domain data are respectively mapped to 2N subcarriers for transmission, so that a PAPR can be reduced, and PAPR distribution after frequency domain duplication is basically consistent with PAPR distribution before the frequency domain duplication, thereby resolving a problem of a high PAPR caused by the frequency domain duplication. In addition, because the original frequency domain data is a real number, a part of the original frequency domain data is multiplied by i or −i, so that the part of the original frequency domain data is changed to a complex number. Therefore, when the original frequency domain data is transmitted through a radio frequency circuit, diversity gains of an I path and a Q path (the I path and the Q path represent two orthogonal paths of an analog signal and respectively represent a real part and an imaginary part of a complex symbol, and generally the real part is referred to as the I path and the imaginary part is referred to as the Q path) can be fully used, thereby improving system performance.

Optionally, the communication method in a wireless local area network may further include the following steps.

S103: A second communication apparatus receives a second frequency domain signal, where the second frequency domain signal is obtained after the first frequency domain signal is transmitted through a radio channel.

S104: The second communication apparatus performs preset processing on the second frequency domain signal, to obtain the N pieces of original frequency domain data.

Optionally, the second communication apparatus receives the second frequency domain signal, where the second frequency domain signal is obtained after the first frequency domain signal is transmitted through the radio channel. It should be understood that the second frequency domain signal herein may be obtained after a radio frequency signal received by an antenna of the second communication apparatus is processed by a low noise amplifier and then the radio frequency signal is down-converted into a baseband signal, then a baseband digital signal is generated through automatic gain control and analog-to-digital conversion, and then a frequency and time correction is performed on the baseband digital signal and serial-to-parallel conversion is performed. It should be further understood that, because a signal sent by the first communication apparatus through an antenna is transmitted in a radio channel, and because a factor such as noise exists in the radio channel, the radio frequency signal received by the antenna of the second communication apparatus is different from the signal sent by the first communication apparatus through the antenna to some extent. To describe an operation of a receive end (that is, the second communication apparatus), the present disclosure does not emphasize a difference between a signal received by the receive end (that is, the second communication apparatus) and a signal sent by a transmit end (that is, the first communication apparatus). It should be further understood that, if impact of the radio channel on the signal is ignored, the first frequency domain signal is the same as the second frequency domain signal.

Optionally, after obtaining the second frequency domain signal, the second communication apparatus performs preset processing on the second frequency domain signal, to obtain the N pieces of original frequency domain data. The second frequency domain signal is obtained after the first frequency domain signal is transmitted through the radio channel, and the first frequency domain signal includes the subsignal obtained by mapping the N pieces of first frequency domain data to the first group of subcarriers and the subsignal obtained by mapping the N pieces of second frequency domain data to the second group of subcarriers. Because data is duplicated in frequency domain, any complete data can be used to restore original information. Certainly, the receive end (that is, the second communication apparatus) may also perform channel equalization on the second frequency domain signal by using a maximum ratio combining (MRC) technology, to further improve system performance.

The following describes several possible implementations in which the receive end restores an original signal.

In an implementation, the second communication apparatus performs reverse phase rotation on data on subcarriers at even positions or data on subcarriers at odd positions in the first group of subcarriers (for example, the first N subcarriers), to obtain the N pieces of original frequency domain data. The reverse phase rotation herein may be understood as phase rotation in a reverse direction by a same angle, so as to eliminate impact caused by phase rotation performed by the transmit end (that is, the first communication apparatus). Herein, an angle of the reverse phase rotation needs to be determined based on an angle of the phase rotation performed by the transmit end (that is, the first communication apparatus). For example, the angle of the phase rotation performed by the transmit end is 90° (that is, multiplied by a pure imaginary number i), and the angle of the reverse phase rotation is −90° (that is, multiplied by a pure imaginary number −i). Alternatively, the angle of the phase rotation performed by the transmit end is −90° (that is, multiplied by a pure imaginary number −i), and the angle of the reverse phase rotation is 90° (that is, multiplied by a pure imaginary number i). Alternatively, the angle of the phase rotation performed by the transmit end is 1800 (that is, multiplied by −1), and the angle of the reverse phase rotation is also 180° (that is, multiplied by −1). If the transmit end (that is, the first communication apparatus) performs phase rotation on data at even positions, the receive end (that is, the second communication apparatus) also needs to perform reverse phase rotation on data at even positions If the transmit end (that is, the first communication apparatus) performs phase rotation on data at odd positions, the receive end (that is, the second communication apparatus) also needs to perform reverse phase rotation on data at odd positions.

In another implementation, the second communication apparatus performs an inverse operation of the preset operation on data on the second group of subcarriers (for example, the last N subcarriers), to obtain the N pieces of first frequency domain data. Then, the second communication apparatus performs reverse phase rotation on data at even positions or data at odd positions in the N pieces of first frequency domain data, to obtain the N pieces of original frequency domain data. Herein, the preset operation is reverse arrangement and/or negation (that is, multiplied by −1), an inverse operation of the reverse arrangement is the reverse arrangement, and an inverse operation of the negation (that is, multiplied by −1) is also the negation. Therefore, the inverse operation of the preset operation is also the reverse arrangement and/or the negation (that is, multiplied by −1). If the preset operation performed by the transmit end is the reverse arrangement, the inverse operation of the preset operation performed by the receive end is also the reverse arrangement. If the preset operation performed by the transmit end is the negation (multiplied by −1), the inverse operation of the preset operation performed by the receive end is also the negation (multiplied by −1). If the preset operation performed by the transmit end is the reverse arrangement and the negation (multiplied by −1), the inverse operation of the preset operation performed by the receive end is also the reverse arrangement and the negation (multiplied by −1). It should be understood that when the inverse operation of the preset operation includes two operations, an execution sequence of the operations is not limited.

In still another implementation, the second communication apparatus performs reverse phase rotation on data on subcarriers at even positions or data on subcarriers at odd positions in the first group of subcarriers (for example, the first N subcarriers), to obtain N pieces of first original frequency domain data. The second communication apparatus performs reverse phase rotation on data on subcarriers at even positions or data on subcarriers at odd positions in the second group of subcarriers (for example, the last N subcarriers), and then performs an inverse operation of the preset operation, to obtain N pieces of second original frequency domain data. The second communication apparatus processes the N pieces of first original frequency domain data and the N pieces of second original frequency domain data according to a maximum ratio combining (MRC) algorithm, to obtain the N piece of original frequency domain data. The MRC algorithm is shown in the following formula (2-1):

$$\hat{s}_i = \frac{h_i^* \times y_i + \hat{h}_i^* \times \hat{y}_i}{|h_i|^2 + |\hat{h}_i|^2} \tag{2-1}$$

In the formula (2-1), i=0, 1, 2, 3, . . . , N. $h_i$ and $\hat{h}_i$ are respectively channel estimation results of subcarriers corresponding to $i^{th}$ data in $i^{th}$ first original frequency domain data $y_i$ and $i^{th}$ data in $i^{th}$ second original frequency domain data $\hat{y}_i$, $h_i^*$ is a conjugate of $h_i$, and $\hat{h}_i^*$ is a conjugate of $\hat{h}_i$. $\hat{s}_i$ represents $i^{th}$ original frequency domain data.

Optionally, after obtaining the N pieces of original frequency domain data, the second communication apparatus may demap the N pieces of original frequency domain data to generate confidence of a corresponding bit sequence, send the confidence to a channel decoding module for decoding, and then descramble an information bit obtained after channel decoding to obtain an original information bit.

It can be learned that in this embodiment, a PAPR can be reduced, and PAPR distribution after frequency domain duplication is basically consistent with PAPR distribution before the frequency domain duplication, thereby resolving a problem of a high PAPR caused by the frequency domain duplication. In this embodiment, a corresponding receive end processing process is further designed, to restore original data.

Embodiment 2

Embodiment 2 of the present disclosure mainly describes how to generate a first frequency domain signal to ensure that PAPR distribution after frequency domain duplication is basically consistent with PAPR distribution before the frequency domain duplication when all original frequency domain data obtained by performing modulation (or constellation point mapping) on a bit sequence is a real number and a spacing between two groups of subcarriers is even-numbered subcarriers.

FIG. 5 is a second schematic flowchart of a communication method in a wireless local area network according to an embodiment of the present disclosure. As shown in FIG. 5, the communication method in a wireless local area network includes, but not limited to, the following steps.

S201: A first communication apparatus generates a first frequency domain signal, where the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers; a spacing between the first group of subcarriers and the second group of subcarriers is even-numbered subcarriers; and the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data.

S202: The first communication apparatus sends the first frequency domain signal.

Optionally, an angle of the phase rotation may be any one of $90°$, $-90°$, and $180°$. In other words, the phase rotation may be equivalent to multiplying by a coefficient. For example, performing phase rotation by $90°$ is equivalent to multiplying a pure imaginary number i, performing phase rotation by $-90°$ is equivalent to multiplying a pure imaginary number $-i$, and performing phase rotation by $180°$ is equivalent to multiplying $-1$. The preset operation may include reverse arrangement (that is, head-to-tail reverse) and/or negation (that is, multiplied by $-1$). Specifically, the first communication apparatus obtains N pieces of original frequency domain data, where all the N pieces of original frequency domain data may be real numbers. N is an integer greater than 1. The N pieces of original frequency domain data include data obtained by performing constellation mapping on one or more pieces of original data (or a bit sequence), and optionally include one or more of one or more $\pm 1$ and one or more 0. The first communication apparatus performs phase rotation on data at even positions and keeps data at odd positions unchanged in the N pieces of original frequency domain data, to obtain the N pieces of first frequency domain data. Alternatively, the first communication apparatus performs phase rotation on data at odd positions and keeps data at even positions unchanged in the N pieces of original frequency domain data, to obtain the N pieces of first frequency domain data. Then, the first communication apparatus performs a preset operation (for example, reverse arrangement and/or negation) on the obtained N pieces of first frequency domain data, to obtain the N pieces of second frequency domain data. When a spacing between the first group of subcarriers and the second group of subcarriers is even-numbered subcarriers, in an implementation, the first communication apparatus performs a cyclic shift of odd-numbered bits on the N pieces of first frequency domain data and then sequentially maps the N pieces of first frequency domain data to the first group of subcarriers, and sequentially maps the N pieces of second frequency domain data to the second group of subcarriers, to obtain the first frequency domain signal. In another implementation, the first communication apparatus sequentially maps the N pieces of first frequency domain data to the first group of subcarriers, and performs a cyclic shift of odd-numbered bits on the N pieces of second frequency domain data and sequentially maps the N pieces of second frequency domain data to the second group of subcarriers, to obtain the first frequency domain signal. The first communication apparatus performs IDFT or IFFT on the first frequency domain signal to convert the first frequency domain signal into a time domain signal, and transmits the time domain signal through a radio frequency circuit.

Optionally, the first group of subcarriers includes N evenly spaced subcarriers, the second group of subcarriers also includes N evenly spaced subcarriers, and subcarriers included in the first group of subcarriers do not overlap subcarriers included in the second group of subcarriers. For a specific implementation, refer to the corresponding descriptions in Embodiment 1.

Optionally, for a relationship between the N pieces of original frequency domain data and a scheduled resource unit of the first communication apparatus, refer to the corresponding descriptions in Embodiment 1.

To better understand the technical solutions provided in embodiments of the present disclosure, the following describes in detail a manner in which the first communication apparatus generates the first frequency domain signal by using an example in which the angle of the phase rotation is $90°$ (that is, multiplied by a pure imaginary number i) or $-90°$ (that is, multiplied by a pure imaginary number $-i$).

Specifically, the first communication apparatus obtains the N pieces of original frequency domain data, where all the N pieces of original frequency domain data are real numbers. N is an integer greater than 1. The N pieces of original frequency domain data include data obtained by performing constellation mapping on one or more pieces of original data (or a bit sequence), and optionally include one or more of one or more 1 and one or more 0. The first communication apparatus multiplies data at even position by a pure imaginary number i (that is, performs phase rotation by $90°$) or a pure imaginary number $-i$ (that is, performs phase rotation by $-90°$), and keeps data at odd positions unchanged in the N pieces of original frequency domain data, to obtain the N pieces of first frequency domain data after the phase rotation, where data at odd positions in the N pieces of first frequency domain data is the same as the data at the odd positions in the N pieces of original frequency domain data. Alternatively, the first communication apparatus multiplies data at odd position by a pure imaginary number i (that is, performs phase rotation by $90°$) or a pure imaginary number $-i$ (that is, performs phase rotation by $-90°$), and keeps data at even positions unchanged in the N pieces of original frequency domain data, to obtain the N pieces of first frequency domain data after the phase rotation, where data at even positions in the N pieces of first frequency domain data is the same as the data at the even positions in the N pieces of original frequency domain data. The first communication apparatus then performs reverse arrangement (that is, head-to-tail reverse) on the N pieces of first frequency domain data, to obtain the N pieces of second frequency domain data, or the first communication apparatus performs reverse arrangement (that is, head-to-tail reverse) and negation (that is, multiplied by $-1$) on the N pieces of first frequency domain data, to obtain the N pieces of second frequency domain data. It should be understood that an execution sequence of the reverse arrangement operation and the negation operation is not limited in this embodiment. The reverse arrangement may be first performed and then the negation is performed, or the negation may be first performed and then the reverse arrangement is performed. Because the spacing between the first group of subcarriers and the second group of subcarriers is the even-numbered subcarriers, the subsignal obtained by directly and sequentially mapping the N pieces of first frequency domain data to the first group of subcarriers and the subsignal obtained by directly and sequentially mapping the N pieces of second frequency domain data to the second group of subcarriers are asymmetrical. When the spacing between the first group of subcarriers and the second group of subcarriers is odd-numbered subcarriers, two subsignals obtained through direct sequential mapping are symmetric relative to a subcarrier. Therefore, when the spacing between the first group of subcarriers and the second group of subcarriers is the even-numbered subcarriers, in an implementation, the first communication apparatus performs a cyclic shift of odd-numbered bits on the N pieces of first frequency domain data and then sequentially maps the N pieces of first frequency domain data to the first group of subcarriers, to obtain a subsignal, and sequentially maps the N pieces of second frequency domain data to the second group of subcarriers, to obtain another subsignal. In another implementation, the first communication apparatus sequentially maps the N pieces of first frequency domain data to the first group of subcarriers, to obtain a subsignal, and performs a cyclic shift of odd-numbered bits on the N pieces of second frequency domain data and sequentially maps the N pieces of second frequency domain data to the second group of subcarriers, to obtain another subsignal. The two subsignals form a complete first frequency domain signal. The N pieces of first frequency domain data and the N pieces of second frequency domain data may be combined into a complete frequency domain sequence, a length of the frequency domain sequence is 2N, and the first frequency domain signal is obtained by mapping the frequency domain sequence whose length is 2N to 2N subcarriers. The first communication apparatus performs IDFT or IFFT on the first frequency domain signal to convert the first frequency domain signal into a time domain signal, and transmits the time domain signal through a radio frequency circuit.

For example, it is assumed that the N pieces of original frequency domain data are represented as $[D(0), D(1), D(2), \ldots, D(N-1)]$, where $D(k)$ represents a random real number, and $0 \leq k \leq N-1$. $D(k)$ is generated based on transmitted data content. The first communication apparatus first processes the N pieces of original frequency domain data $[D(0), D(1), D(2), \ldots, D(N-1)]$, to obtain 2N pieces of new data, and respectively maps the 2N pieces of new data to 2N subcarriers for transmission. Specifically, the first communication apparatus multiplies data at even positions or at odd positions in the N pieces of original frequency domain data $[D(0), D(1), D(2), \ldots, D(N-1)]$ by i or $-i$ (that is, performs phase rotation by 90° or $-90°$), to obtain frequency domain data $[X(0), X(1), X(2), \ldots, X(N-1)]$ after the phase rotation, that is, to obtain the N pieces of first frequency domain data after the phase rotation. It should be understood that, because the first communication apparatus performs phase rotation on only the data at the even positions or at the odd positions in $[D(0), D(1), D(2), \ldots, D(N-1)]$, the phase rotation is performed on half of the N pieces of first frequency domain data, and a phase of the other half data does not change. The first communication apparatus then performs reverse arrangement (that is, head-to-tail reverse) on the N pieces of first frequency domain data $[X(0), X(1), X(2), \ldots, X(N-1)]$ and multiplies the N pieces of first frequency domain data by $-1$ (that is, negation) or 1, to obtain the N pieces of second frequency domain data $[Y(0), Y(1), Y(2), \ldots, Y(N-1)]$. $Y(k)=-X(N-k-1)$ or $Y(k)=X(N-k-1)$, and $0 \leq k \leq N-1$. In this way, data of 2N constellation points is obtained, that is, $\vec{X}=[X(0), X(1), X(2), \ldots, X(N-1)]$ and $\vec{Y}=[Y(0), Y(1), Y(2), \ldots, Y(N-1)]$. If a spacing between two groups of subcarriers (that is, the first group of subcarriers and the second group of subcarriers) is even-numbered subcarriers, the first communication apparatus performs a cyclic shift of one bit to the left on the N pieces of first frequency domain data $[X(0), X(1),$ $X(2), \ldots, X(N-1)]$, to obtain $[X(1), X(2), \ldots, X(N-1), X(0)]$, or performs a cyclic shift of one bit to the right, to obtain $[X(N-1), X(0), X(1), X(2), \ldots, X(N-2)]$, and then sequentially maps the obtained $[X(1), X(2), \ldots, X(N-1), X(0)]$ or $[X(N-1), X(0), X(1), X(2), \ldots, X(N-2)]$ to N evenly spaced subcarriers (that is, the first group of subcarriers), to obtain a subsignal; and sequentially maps the N pieces of second frequency domain data $[Y(0), Y(1), Y(2), \ldots, Y(N-1)]$ to N evenly spaced subcarriers (that is, the second group of subcarriers), to obtain another subsignal. Alternatively, when a spacing between two groups of subcarriers (that is, the first group of subcarriers and the second group of subcarriers) is even-numbered subcarriers, the first communication apparatus sequentially maps the N pieces of first frequency domain data $[X(0), X(1), X(2), \ldots, X(N-1)]$ to N evenly spaced subcarriers (that is, the first group of subcarriers), to obtain a subsignal; and performs a cyclic shift of one bit to the left on the N pieces of second frequency domain data $[Y(0), Y(1), Y(2), \ldots, Y(N-1)]$, to obtain $[Y(1), Y(2), \ldots, Y(N-1), Y(0)]$, or performs a cyclic shift of one bit to the right, to obtain $[Y(N-1), Y(0), Y(1), Y(2), \ldots, Y(N-2)]$, and then sequentially maps the obtained $[Y(1), Y(2), \ldots, Y(N-1), Y(0)]$ or $[Y(N-1), Y(0), Y(1), Y(2), \ldots, Y(N-2)]$ to N evenly spaced subcarriers (that is, the second group of subcarriers), to obtain another subsignal. The two subsignals form a complete first frequency domain signal. The first communication apparatus performs IDFT transform on the first frequency domain signal to time domain, and transmits the time domain signal through a radio frequency circuit.

It can be learned that, in this embodiment, for a scenario in which data is duplicated in frequency domain (for example, DCM and a DUP mode are used), when a spacing between two groups of subcarriers is even-numbered subcarriers, 2N pieces of new frequency domain data (that is, the N pieces of first frequency domain data and the N pieces of second frequency domain data) are obtained by performing a series of operations such as phase rotation, reverse arrangement, and negation on original frequency domain data, and a cyclic shift of odd-numbered bits is performed on either of the N pieces of first frequency domain data and the N pieces of second frequency domain data and then sequential mapping is performed, so that two frequency domain subsequences obtained through mapping are symmetric about a subcarrier. A PAPR can be reduced, and PAPR distribution after frequency domain duplication is basically consistent with PAPR distribution before the frequency domain duplication, thereby resolving a problem of a high PAPR caused by the frequency domain duplication. In addition, because the original frequency domain data is a real number, a part of the original frequency domain data is multiplied by i or $-i$, so that the part of the original frequency domain data is changed to a complex number. Therefore, when the original frequency domain data is transmitted through a radio frequency circuit, diversity gains of an I path and a Q path can be fully used, thereby improving system performance.

Optionally, the communication method in a wireless local area network may further include the following steps.

S203: A second communication apparatus receives a second frequency domain signal, where the second frequency domain signal is obtained after the first frequency domain signal is transmitted through a radio channel.

S204: The second communication apparatus performs preset processing on the second frequency domain signal, to obtain the N pieces of original frequency domain data.

Optionally, the second communication apparatus receives the second frequency domain signal, where the second frequency domain signal is obtained after the first frequency domain signal is transmitted through the radio channel. After obtaining the second frequency domain signal, the second communication apparatus performs preset processing on the second frequency domain signal, to obtain the N pieces of original frequency domain data. The first frequency domain signal includes a subsignal obtained by performing a cyclic shift of odd-numbered bits on the N pieces of first frequency domain data and then mapping the N pieces of first frequency domain data to the first group of subcarriers and a subsignal obtained by mapping the N pieces of second frequency domain data to the second group of subcarriers. Alternatively, the first frequency domain signal includes a subsignal obtained by mapping the N pieces of first frequency domain data to the first group of subcarriers and a subsignal obtained by performing a cyclic shift of odd-numbered bits on the N pieces of second frequency domain data and then mapping the N pieces of second frequency domain data to the second group of subcarriers. Because data is duplicated in frequency domain, any complete data can be used to restore original information. Certainly, the receive end (that is, the second communication apparatus) may also perform channel equalization on the second frequency domain signal by using an MRC technology, to further improve system performance. The following describes several possible implementations in which the receive end restores an original signal. It should be further understood that, if impact of the radio channel on the signal is ignored, the first frequency domain signal is the same as the second frequency domain signal.

In an implementation, the second communication apparatus performs a cyclic shift of odd-numbered bits on data on the first group of subcarriers and then performs reverse phase rotation on data on subcarriers at even positions or data on subcarriers at odd positions, to obtain the N pieces of original frequency domain data. The cyclic shift of the odd-numbered bits herein may be a cyclic shift of one bit to the left or a cyclic shift of one bit to the right. If the transmit end (that is, the first communication apparatus) performs the cyclic shift of one bit to the left, the receive end (that is, the second communication apparatus) needs to perform the cyclic shift of one bit to the right. On the contrary, if the transmit end (that is, the first communication apparatus) performs the cyclic shift of one bit to the right, the receive end (that is, the second communication apparatus) needs to perform the cyclic shift of one bit to the left. Alternatively, the second communication apparatus performs reverse phase rotation on data on subcarriers at even positions or data on subcarriers at odd positions in the first group of subcarriers, to obtain the N pieces of original frequency domain data.

In another implementation, the second communication apparatus performs an inverse operation of the preset operation on data on the second group of subcarriers, to obtain the N pieces of first frequency domain data. Then, the second communication apparatus performs reverse phase rotation on data at even positions or data at odd positions in the N pieces of first frequency domain data, to obtain the N pieces of original frequency domain data. Alternatively, the second communication apparatus performs a cyclic shift of odd-numbered bits on data on the second group of subcarriers, and then performs an inverse operation of the preset operation, to obtain the N pieces of first frequency domain data. Then, the second communication apparatus performs reverse phase rotation on data at even positions or data at odd positions in the N pieces of first frequency domain data, to obtain the N pieces of original frequency domain data.

In still another implementation, the second communication apparatus performs a cyclic shift of odd-numbered bits on data on the first group of subcarriers and then performs reverse phase rotation on data on subcarriers at even positions or data on subcarriers at odd positions, to obtain N pieces of first original frequency domain data. The second communication apparatus performs reverse phase rotation on data on subcarriers at even positions or data on subcarriers at odd positions in the second group of subcarriers, and then performs an inverse operation of the preset operation, to obtain N pieces of second original frequency domain data. The second communication apparatus processes the N pieces of first original frequency domain data and the N pieces of second original frequency domain data according to a maximum ratio combining (MRC) algorithm, to obtain the N piece of original frequency domain data. Alternatively, the second communication apparatus performs reverse phase rotation on data on subcarriers at even positions or data on subcarriers at odd positions in the first group of subcarriers, to obtain N pieces of first original frequency domain data. The second communication apparatus performs a cyclic shift of odd-numbered bits on data on the second group of subcarriers, and then performs an inverse operation of the preset operation, to obtain the N pieces of first frequency domain data. The second communication apparatus performs reverse phase rotation on data at even positions or data at odd positions in the N pieces of first frequency domain data, to obtain N pieces of second original frequency domain data. The second communication apparatus processes the N pieces of first original frequency domain data and the N pieces of second original frequency domain data according to a maximum ratio combining (MRC) algorithm, to obtain the N piece of original frequency domain data.

Optionally, after obtaining the N pieces of original frequency domain data, the second communication apparatus may demap the N pieces of original frequency domain data to generate confidence of a corresponding bit sequence, send the confidence to a channel decoding module for decoding, and then descramble an information bit obtained after channel decoding to obtain an original information bit.

It can be learned that in this embodiment, a PAPR can be reduced, and PAPR distribution after frequency domain duplication is basically consistent with PAPR distribution before the frequency domain duplication, thereby resolving a problem of a high PAPR caused by the frequency domain duplication. In this embodiment, a corresponding receive end processing process is further designed, to restore original data.

Embodiment 3

Embodiment 3 of the present disclosure mainly describes how to generate a first frequency domain signal to ensure that PAPR distribution after frequency domain duplication is basically consistent with PAPR distribution before the frequency domain duplication when there is a complex number in original frequency domain data obtained by performing modulation (or constellation point mapping) on a bit sequence and a spacing between two groups of subcarriers is odd-numbered subcarriers.

FIG. 6 is a third schematic flowchart of a communication method in a wireless local area network according to an embodiment of the present disclosure. As shown in FIG. 6, the communication method in a wireless local area network includes, but not limited to, the following steps.

S301: A first communication apparatus generates a first frequency domain signal, where the first frequency domain signal includes a subsignal obtained by mapping N pieces of first frequency domain data to a first group of subcarriers and a subsignal obtained by sequentially mapping N pieces of second frequency domain data to a second group of subcarriers, a spacing between the first group of subcarriers and the second group of subcarriers is odd-numbered subcarriers, the N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data.

S302: The first communication apparatus sends the first frequency domain signal.

Optionally, the preset operation includes one or more of conjugation and reverse arrangement. The first communication apparatus obtains the N pieces of original frequency domain data, where the N pieces of original frequency domain data include a complex number. N is an integer greater than 1. The N pieces of original frequency domain data include data obtained by performing constellation mapping on one or more pieces of original data (or a bit sequence), and optionally include one or more of one or more ±1 and one or more 0. It should be understood that the data obtained by performing constellation mapping on the plurality of pieces of original data (or the bit sequence) includes a complex number. In an implementation, the first communication apparatus performs conjugation and/or reverse arrangement on the N pieces of original frequency domain data, to obtain the N pieces of second frequency domain data. In another implementation, the first communication apparatus performs conjugation on the N pieces of original frequency domain data and performs negation on data at even positions or odd positions, to obtain the N pieces of second frequency domain data. Alternatively, the first communication apparatus performs reverse arrangement on the N pieces of original frequency domain data and performs negation on data at even positions or odd positions, to obtain the N pieces of second frequency domain data. In still another implementation, the first communication apparatus performs conjugation and reverse arrangement (that is, head-to-tail reverse) on the N pieces of original frequency domain data and performs negation (that is, multiplied by −1) on data at even positions or odd positions, to obtain the N pieces of second frequency domain data. It should be understood that, if the negation is performed on the data at the even positions, the data at the odd positions is unchanged. Similarly, if the negation is performed on the data at the odd positions, the data at the even positions is unchanged. It should be further understood that, in this embodiment, if the conjugation is performed on a real number, a conjugate is equal to the real number. For example, after the conjugation is performed on a real number 5, a conjugate is still equal to 5. It should be further understood that, in this embodiment, a sequence of performing the three operations of the conjugation, the reverse arrangement, and the negation on the data at the even positions or the odd positions is not limited. An execution sequence may be the conjugation, the reverse arrangement, and the negation on the data at the even positions or the odd positions, or may be the reverse arrangement, the conjugation, and the negation on the data at the even positions or the odd positions, or may be another execution sequence such as the negation on the data at the even positions or the odd positions, the conjugation, and the reverse arrangement. The first communication apparatus may sequentially map the N pieces of original frequency domain data to the first group of subcarriers, to obtain a subsignal, and then sequentially map the N pieces of second frequency domain data to the second group of subcarriers, to obtain another subsignal. Alternatively, the first communication apparatus uses the N pieces of original frequency domain data as the N pieces of first frequency domain data, then sequentially maps the N pieces of first frequency domain data to the first group of subcarriers, to obtain a subsignal, and then sequentially map the N pieces of second frequency domain data to the second group of subcarriers, to obtain another subsignal. If a spacing between the first group of subcarriers and the second group of subcarriers is odd-numbered subcarriers, the two subsignals are symmetric relative to a subcarrier. For example, a subcarrier with a largest number in the first group of subcarriers and a subcarrier with a smallest number in the second group of subcarriers are spaced by one subcarrier, and the two subsignals are symmetric relative to the spaced subcarrier. The two subsignals form a complete first frequency domain signal. The N pieces of first frequency domain data and the N pieces of second frequency domain data may be combined into a complete frequency domain sequence, a length of the frequency domain sequence is 2N, and the first frequency domain signal is obtained by mapping the frequency domain sequence whose length is 2N to 2N subcarriers. The first communication apparatus performs IDFT or IFFT on the first frequency domain signal to convert the first frequency domain signal into a time domain signal, and transmits the time domain signal through a radio frequency circuit.

Optionally, the first group of subcarriers includes N evenly spaced subcarriers, the second group of subcarriers also includes N evenly spaced subcarriers, and subcarriers included in the first group of subcarriers do not overlap subcarriers included in the second group of subcarriers. For a specific implementation, refer to the corresponding descriptions in Embodiment 1.

Optionally, for a relationship between the N pieces of original frequency domain data and a scheduled resource unit of the first communication apparatus, refer to the corresponding descriptions in Embodiment 1.

For example, it is assumed that the N pieces of original frequency domain data are represented as [D(0), D(1), D(2), . . . , D(N−1)], where D(k) represents a random complex number, and $0 \leq k \leq N-1$. D(k) is generated based on transmitted data content. It should be understood that both a real number and a pure imaginary number may be understood as special complex numbers. The real number may be understood as a complex number without an imaginary part, and the pure imaginary number may be understood as a complex number without a real part. The first communication apparatus first processes the N pieces of original frequency domain data [D(0), D(1), D(2), . . . , D(N−1)], to obtain another N pieces of new data. Specifically, the first communication apparatus performs conjugation on the N pieces of original frequency domain data [D(0), D(1), D(2), . . . , D(N−1)], then performs reverse arrangement (that is, head-to-tail reverse) on the conjugated data, and finally performs negation (that is, multiplied by −1) on data at even positions in the data after the reverse arrangement and keeps data at odd positions unchanged or performs negation (multiplied by −1) on data at odd positions in the data after the reverse arrangement and keeps data at even positions unchanged, to obtain the N pieces of second frequency domain data [Y(0), Y(1), Y(2), . . . , Y(N−1)]. A relationship between the second frequency domain data and the original frequency domain data may be represented by the following formula (2-2):

$$Y(k) \begin{cases} conj(D(N-k-1)) \times (-1)^k, \\ or \\ conj(D(N-k-1)) \times (-1)^{k+1} \end{cases} \quad (2\text{-}2)$$

In the formula (2-2), $0 \le k \le N-1$, and a function conj( ) represents conjugation, for example, conj(a+bi)=a−bi.

Then, the first communication apparatus sequentially maps the N pieces of original frequency domain data [D(0), D(1), D(2), . . . , D(N−1)] to N evenly spaced subcarriers (that is, the first group of subcarriers)(for example, subcarriers in an RU) and sequentially maps then N pieces of second frequency domain data [Y(0), Y(1), Y(2), . . . , Y(N−1)] to N evenly spaced subcarriers (that is, the second group of subcarriers), to obtain the first frequency domain signal. A spacing between the two groups of subcarriers (that is, the first group of subcarriers and the second group of subcarriers) is odd-numbered subcarriers. Then, the first communication apparatus performs IDFT transform on the first frequency domain signal to time domain, and transmits the time domain signal through a radio frequency circuit.

To describe impact of the technical solutions provided in embodiments of the present disclosure on a PAPR, the following describes impact of the technical solutions provided in embodiments of the present disclosure on the PAPR by using a simulation result comparison diagram.

Figure 7:
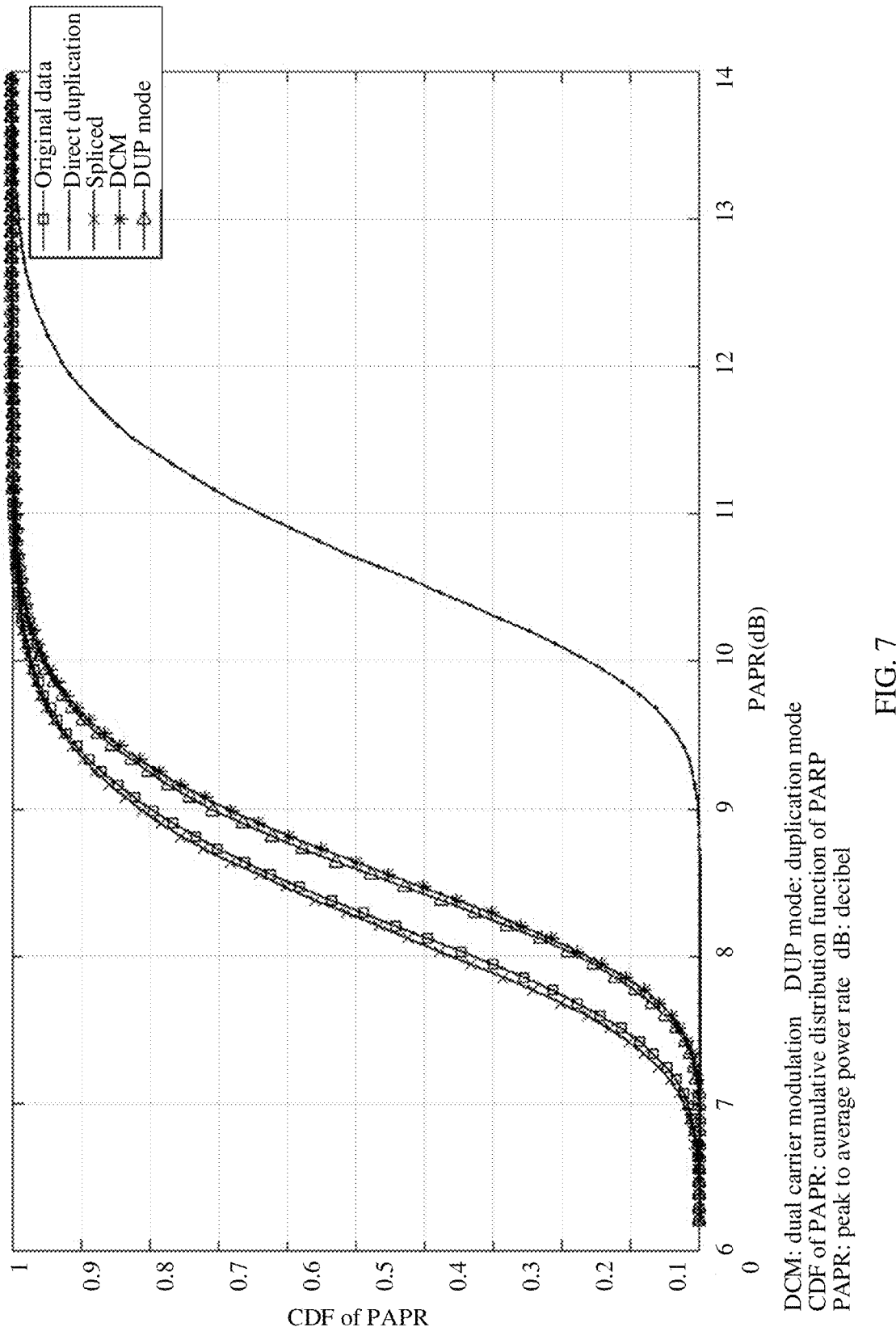
FIG. 7 is another PAPR simulation result comparison diagram according to an embodiment of the present disclosure.

FIG. 7 is another PAPR simulation result comparison diagram according to an embodiment of the present disclosure. A simulation condition in FIG. 7 is as follows: An RU 242 is used as an example, and N=242. Quadrature phase shift keying (QPSK) modulation is used, and data obtained by performing QPSK modulation on a plurality of pieces of original data (or a bit sequence) is 1+i, 1−i, −1+i, or −1−i, and $\vec{Y}$=[Y(0), Y(1), Y(2), . . . , Y(N−1)] is generated by using the method in the foregoing example. Y(k)=conj(D (N−k−1))×(−1)$^k$ means performing conjugation and reverse arrangement on D(k) and performing negation on data at odd positions. Then, [D(0), D(1), D(2), . . . , D(N−1)] is sequentially mapped to subcarriers in an RU 242, and $\vec{Y}$ is sequentially mapped to subcarriers in another RU 242. There are five subcarriers between the two RUs 242, and the two RUs 242 are spliced together. A PAPR of original data, a PAPR of direct duplication, a spliced PAPR (that is, a PAPR in this embodiment), a PAPR of DCM, and a PAPR in a DUP mode are shown in FIG. 7. In FIG. 7, a horizontal coordinate represents a PAPR value, and a vertical coordinate represents a CDF of the PAPR. It can be learned from FIG. 7 that, if data is directly duplicated in frequency domain, an average PAPR of the data is increased by 2 dB to 3 dB compared with the PAPR of the original data. For example, a vertical coordinate in FIG. 7 is equal to 0.4, the PAPR of the original data is approximately 8.1 dB, and a PAPR of the data that is directly duplicated in frequency domain is approximately 10.5 dB. It can also be learned from FIG. 7 that the PAPR of the DCM and the PAPR in the DUP mode are reduced to some extent compared with the PAPR of the data that is directly duplicated in frequency domain, but the PAPR of the DCM and the PAPR in the DUP mode are still obviously greater than the PAPR of the original data. However, in this embodiment, distribution of the spliced PAPR may be basically consistent with distribution of the PAPR of the original data.

Therefore, in this embodiment, for a scenario in which data needs to be duplicated in frequency domain (for example, DCM and a DUP mode are used), when original frequency domain data includes a complex number, N pieces of new frequency domain data (that is, the N pieces of second frequency domain data) are obtained by performing a series of operations such as conjugation and reverse arrangement on N pieces of original frequency domain data and negation on data at even positions or data at odd positions, then the N pieces of original frequency domain data (that is, the N pieces of first frequency domain data) and the N pieces of new frequency domain data are respectively mapped to two group of evenly spaced subcarriers, to obtain the first frequency domain signal, and finally, IDFT transform is performed on the generated first frequency domain signal to time domain and then the time domain signal is transmitted through a radio frequency module. Because the newly generated frequency domain data (that is, the second frequency domain data) in a half bandwidth is no longer a simple duplication of the frequency domain data (that is, the first frequency domain data) in the other half bandwidth, a PAPR of a signal in the entire bandwidth is reduced. Therefore, in this embodiment, a PAPR can be reduced, so that PAPR distribution after frequency domain duplication is basically consistent with PAPR distribution before the frequency domain duplication, thereby resolving a problem of a high PAPR caused by the frequency domain duplication.

Optionally, the communication method in a wireless local area network may further include the following steps.

S303: A second communication apparatus receives a second frequency domain signal, where the second frequency domain signal is obtained after the first frequency domain signal is transmitted through a radio channel.

S304: The second communication apparatus performs preset processing on the second frequency domain signal, to obtain the N pieces of original frequency domain data.

Optionally, the second communication apparatus receives the second frequency domain signal, where the second frequency domain signal is obtained after the first frequency domain signal is transmitted through the radio channel. After obtaining the second frequency domain signal, the second communication apparatus performs preset processing on the second frequency domain signal, to obtain the N pieces of original frequency domain data. The first frequency domain signal includes a subsignal obtained by mapping the N pieces of first frequency domain data to the first group of subcarriers and a subsignal obtained by sequentially mapping the N pieces of second frequency domain data to the second group of subcarriers. Because data is duplicated in frequency domain, any complete data can be used to restore original information. Certainly, the receive end (that is, the second communication apparatus) may also perform channel equalization on the first frequency domain signal by using an MRC technology, to further improve system performance. The following describes several possible implementations in which the receive end restores an original signal.

In an implementation, the second communication apparatus obtains the N pieces of original frequency domain data carried on the first group of subcarriers.

In another implementation, the second communication apparatus performs negation (multiplied by −1) on data on subcarriers at even positions or data on subcarriers at odd positions in the second group of subcarriers (for example, the last N subcarriers), and then performs an inverse operation of the preset operation, to obtain the N pieces of original frequency domain data. Herein, the preset operation includes one or more of conjugation and reverse arrangement, and an inverse operation of the conjugation is the conjugation, and an inverse operation of the reverse arrangement is also the reverse arrangement. Therefore, the inverse operation of the preset operation includes one or more of the conjugation and the reverse arrangement. It should be understood that a transmit end (that is, the first communication apparatus) performs a specific operation when generating the first frequency domain signal, and a receive end (that is, the second communication apparatus) correspondingly performs an inverse operation of the operation, to restore the original frequency domain data.

In still another implementation, the second communication apparatus obtains N pieces of first original frequency domain data carried on the first group of subcarriers. The second communication apparatus performs negation (multiplied by −1) on data on subcarriers at even positions or data on subcarriers at odd positions in the second group of subcarriers (for example, the last N subcarriers), and then performs an inverse operation of the preset operation, to obtain N pieces of second original frequency domain data. The second communication apparatus processes the N pieces of first original frequency domain data and the N pieces of second original frequency domain data according to a maximum ratio combining algorithm, to obtain the N piece of original frequency domain data.

Optionally, after obtaining the N pieces of original frequency domain data, the second communication apparatus may demap the N pieces of original frequency domain data to generate confidence of a corresponding bit sequence, send the confidence to a channel decoding module for decoding, and then descramble an information bit obtained after channel decoding to obtain an original information bit.

It can be learned that in this embodiment, a PAPR can be reduced, and PAPR distribution after frequency domain duplication is basically consistent with PAPR distribution before the frequency domain duplication, thereby resolving a problem of a high PAPR caused by the frequency domain duplication. In this embodiment, a corresponding receive end processing process is further designed, to restore original data.

Embodiment 4

Embodiment 4 of the present disclosure mainly describes how to generate a first frequency domain signal to ensure that PAPR distribution after frequency domain duplication is basically consistent with PAPR distribution before the frequency domain duplication when there is a complex number in original frequency domain data obtained by performing modulation (or constellation point mapping) on a bit sequence and a spacing between two groups of subcarriers is even-numbered subcarriers.

FIG. 8 is a fourth schematic flowchart of a communication method in a wireless local area network according to an embodiment of the present disclosure. As shown in FIG. 8, the communication method in a wireless local area network includes, but not limited to, the following steps.

S401: A first communication apparatus generates a first frequency domain signal, where the first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers; a spacing between the first group of subcarriers and the second group of subcarriers is even-numbered subcarriers; and the N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data.

S402: The first communication apparatus sends the first frequency domain signal.

Optionally, the preset operation includes one or more of conjugation and reverse arrangement. The first communication apparatus obtains the N pieces of original frequency domain data, where the N pieces of original frequency domain data include a complex number. N is an integer greater than 1. The N pieces of original frequency domain data include data obtained by performing constellation mapping on one or more pieces of original data (or a bit sequence), and optionally include one or more of one or more ±1 and one or more 0. It should be understood that the data obtained by performing constellation mapping on the plurality of pieces of original data (or the bit sequence) includes a complex number. In an implementation, the first communication apparatus performs conjugation and/or reverse arrangement on the N pieces of original frequency domain data, to obtain the N pieces of second frequency domain data. In another implementation, the first communication apparatus performs conjugation on the N pieces of original frequency domain data and performs negation on data at even positions or odd positions, to obtain the N pieces of second frequency domain data. Alternatively, the first communication apparatus performs reverse arrangement on the N pieces of original frequency domain data and performs negation on data at even positions or odd positions, to obtain the N pieces of second frequency domain data. In still another implementation, the first communication apparatus performs conjugation and reverse arrangement (that is, head-to-tail reverse) on the N pieces of original frequency domain data and performs negation (that is, multiplied by −1) on data at even positions or odd positions, to obtain the N pieces of second frequency domain data. It should be understood that, if the negation is performed on the data at the even positions, the data at the odd positions is unchanged. Similarly, if the negation is performed on the data at the odd positions, the data at the even positions is unchanged. It should be further understood that, in this embodiment, if the conjugation is performed on a real number, a conjugate is equal to the real number. For example, after the conjugation is performed on a real number 5, a conjugate is still equal to 5. It should be further understood that, in this embodiment, a sequence of performing the three operations of the conjugation, the reverse arrangement, and the negation on the data at the even positions or the odd positions is not limited. An execution sequence may be the conjugation, the reverse arrangement, and the negation on the data at the even positions or the odd positions, or may be the reverse arrangement, the conjugation, and the negation on the data at the even positions or the odd positions, or may be another execution sequence such as the negation on the data at the even positions or the odd positions, the conjugation, and the reverse arrangement. Because the spacing between the first group of subcarriers and the second group of subcarriers is the even-numbered subcarriers, the subsignal obtained by directly and sequentially mapping the N pieces of original frequency domain data to the first group of subcarriers and the subsignal obtained by directly and sequentially mapping the N pieces of second frequency domain data to the second group of subcarriers are asymmetrical. When the spacing between the first group of subcarriers and the second group of subcarriers is odd-numbered subcarriers, two subsignals obtained through direct sequential mapping are symmetric relative to a subcarrier. Therefore, when the spacing between the first group of subcarriers and the second group of subcarriers is the even-numbered subcarriers, in an implementation, the first communication apparatus performs a cyclic shift of odd-numbered bits on the N pieces of original frequency domain data and then sequentially maps the N pieces of original frequency domain data to the first group of subcarriers, to obtain a subsignal, and sequentially maps the N pieces of second frequency domain data to the second group of subcarriers, to obtain a second frequency domain subsequence. Alternatively, the first communication apparatus uses the N pieces of original frequency domain data as the N pieces of first frequency domain data, then performs a cyclic shift of odd-numbered bits on the N pieces of first frequency domain data and sequentially maps the N pieces of first frequency domain data to the first group of subcarriers, to obtain a subsignal, and then sequentially map the N pieces of second frequency domain data to the second group of subcarriers, to obtain another subsignal. In another implementation, the first communication apparatus sequentially maps the N pieces of original frequency domain data to the first group of subcarriers, to obtain a subsignal, and performs a cyclic shift of odd-numbered bits on the N pieces of second frequency domain data and sequentially maps the N pieces of second frequency domain data to the second group of subcarriers, to obtain another subsignal. Alternatively, the first communication apparatus uses the N pieces of original frequency domain data as the N pieces of first frequency domain data, then sequentially maps the N pieces of first frequency domain data to the first group of subcarriers, to obtain a subsignal, and then performs a cyclic shift of odd-numbered bits on the N pieces of second frequency domain data and sequentially map the N pieces of second frequency domain data to the second group of subcarriers, to obtain another subsignal. The two subsignals form a complete first frequency domain signal. The N pieces of first frequency domain data and the N pieces of second frequency domain data may be combined into a complete frequency domain sequence, a length of the frequency domain sequence is 2N, and the first frequency domain signal is obtained by mapping the frequency domain sequence whose length is 2N to 2N subcarriers. The first communication apparatus performs IDFT or IFFT on the first frequency domain signal to convert the first frequency domain signal into a time domain signal, and transmits the time domain signal through a radio frequency circuit. A length of the frequency domain sequence is 2N.

Optionally, the first group of subcarriers includes N evenly spaced subcarriers, the second group of subcarriers also includes N evenly spaced subcarriers, and subcarriers included in the first group of subcarriers do not overlap subcarriers included in the second group of subcarriers. For a specific implementation, refer to the corresponding descriptions in Embodiment 1.

Optionally, for a relationship between the N pieces of original frequency domain data and a scheduled resource unit of the first communication apparatus, refer to the corresponding descriptions in Embodiment 1.

For example, it is assumed that the N pieces of original frequency domain data are represented as [D(0), D(1), D(2), . . . , D(N−1)], where D(k) represents a random complex number, and $0 \leq k \leq N-1$. D(k) is generated based on transmitted data content. It should be understood that both a real number and a pure imaginary number may be understood as special complex numbers. The real number may be understood as a complex number without an imaginary part, and the pure imaginary number may be understood as a complex number without a real part. The first communication apparatus first processes the N pieces of original frequency domain data [D(0), D(1), D(2), . . . , D(N−1)], to obtain another N pieces of new data. Specifically, the first communication apparatus performs conjugation on the N pieces of original frequency domain data [D(0), D(1), D(2), . . . , D(N−1)], then performs reverse arrangement (that is, head-to-tail reverse) on the conjugated data, and finally performs negation (that is, multiplied by −1) on data at even positions in the data after the reverse arrangement and keeps data at odd positions unchanged or performs negation (multiplied by −1) on data at odd positions in the data after the reverse arrangement and keeps data at even positions unchanged, to obtain the N pieces of second frequency domain data [Y(0), Y(1), Y(2), . . . , Y(N−1)]. A relationship between the second frequency domain data and the original frequency domain data may be represented by the foregoing formula (2-1). If a spacing between two groups of subcarriers (that is, the first group of subcarriers and the second group of subcarriers) is even-numbered subcarriers, the first communication apparatus performs a cyclic shift of one bit to the left on the N pieces of original frequency domain data [D(0), D(1), D(2), . . . , D(N−1)], to obtain [D(1), D(2), . . . , D(N−1), D(0)], or performs a cyclic shift of one bit to the right, to obtain [D(N−1), D(0), D(1), D(2), . . . , D(N−2)] and then sequentially maps the obtained [D(1), D(2), . . . , D(N−1), and D(0)] or [D(N−1), D(0), D(1), D(2), . . . , D(N−2)] to N evenly spaced subcarriers (that is, the first group of subcarriers), to obtain a subsignal; and sequentially maps the N pieces of second frequency domain data [Y(0), Y(1), Y(2), . . . , Y(N−1)] to N evenly spaced subcarriers (that is, the second group of subcarriers), to obtain another subsignal. Alternatively, when a spacing between two groups of subcarriers (that is, the first group of subcarriers and the second group of subcarriers) is even-numbered subcarriers, the first communication apparatus sequentially maps the N pieces of original frequency domain data [D(0), D(1), D(2), . . . , D(N−1)] to N evenly spaced subcarriers (that is, the first group of subcarriers), to obtain a subsignal; and performs a cyclic shift of one bit to the left on the N pieces of second frequency domain data [Y(0), Y(1), Y(2), . . . , Y(N−1)], to obtain [Y(1), Y(2), . . . , Y(N−1), Y(0)], or performs a cyclic shift of one bit to the right, to obtain [Y(N−1), Y(0), Y(1), Y(2), . . . , Y(N−2)], and then sequentially maps the obtained [Y(1), Y(2), . . . , Y(N−1), Y(0)] or [Y(N−1), Y(0), Y(1), Y(2), . . . , and Y(N−2)] to N evenly spaced subcarriers (that is, the second group of subcarriers), to obtain another subsignal. The two subsignals form a complete first frequency domain signal. The first communication apparatus performs IDFT transform on the first frequency domain signal to time domain, and transmits the time domain signal through a radio frequency circuit.

It can be learned that in this embodiment, for a scenario in which data is duplicated in frequency domain (for example, DCM and a DUP mode are used), a PAPR can be reduced, and PAPR distribution after frequency domain duplication is basically consistent with PAPR distribution before the frequency domain duplication, thereby resolving a problem of a high PAPR caused by the frequency domain duplication.

Optionally, the communication method in a wireless local area network may further include the following steps.

S403: A second communication apparatus receives a second frequency domain signal, where the second frequency domain signal is obtained after the first frequency domain signal is transmitted through a radio channel.

S404: The second communication apparatus performs preset processing on the second frequency domain signal, to obtain the N pieces of original frequency domain data.

Optionally, the second communication apparatus receives the second frequency domain signal, where the second frequency domain signal is obtained after the first frequency domain signal is transmitted through the radio channel. After obtaining the second frequency domain signal, the second communication apparatus performs preset processing on the second frequency domain signal, to obtain the N pieces of original frequency domain data. The first frequency domain signal includes a subsignal obtained by performing a cyclic shift of odd-numbered bits on the N pieces of first frequency domain data and then mapping the N pieces of first frequency domain data to the first group of subcarriers and a subsignal obtained by mapping the N pieces of second frequency domain data to the second group of subcarriers. Alternatively, the first frequency domain signal includes a subsignal obtained by mapping the N pieces of first frequency domain data to the first group of subcarriers and a subsignal obtained by performing a cyclic shift of odd-numbered bits on the N pieces of second frequency domain data and then mapping the N pieces of second frequency domain data to the second group of subcarriers. Because data is duplicated in frequency domain, any complete data can be used to restore original information. Certainly, the receive end (that is, the second communication apparatus) may also perform channel equalization on the first frequency domain signal by using an MRC technology, to further improve system performance. The following describes several possible implementations in which the receive end restores an original signal.

In an implementation, the second communication apparatus performs a cyclic shift of odd-numbered bits on data on the first group of subcarriers, to obtain the N pieces of original frequency domain data. The cyclic shift of the odd-numbered bits herein may be a cyclic shift of one bit to the left or a cyclic shift of one bit to the right. If the transmit end (that is, the first communication apparatus) performs the cyclic shift of one bit to the left, the receive end (that is, the second communication apparatus) needs to perform the cyclic shift of one bit to the right. On the contrary, if the transmit end (that is, the first communication apparatus) performs the cyclic shift of one bit to the right, the receive end (that is, the second communication apparatus) needs to perform the cyclic shift of one bit to the left. Alternatively, the second communication apparatus obtains the N pieces of original frequency domain data carried on the first group of subcarriers.

In another implementation, the second communication apparatus performs negation (multiplied by −1) on data on subcarriers at even positions or data on subcarriers at odd positions in the second group of subcarriers (for example, the last N subcarriers), and then performs an inverse operation of the preset operation, to obtain the N pieces of original frequency domain data. Alternatively, the second communication apparatus performs a cyclic shift of odd-numbered bits on data on the second group of subcarriers, then performs negation (multiplied by −1) on data on subcarriers at even positions or data on subcarriers at odd positions, and then performs an inverse operation of the preset operation, to obtain the N pieces of original frequency domain data.

In still another implementation, the second communication apparatus performs a cyclic shift of odd-numbered bits on data on the first group of subcarriers, to obtain N pieces of first original frequency domain data. The second communication apparatus performs negation (multiplied by −1) on data on subcarriers at even positions or data on subcarriers at odd positions in the second group of subcarriers (for example, the last N subcarriers), and then performs an inverse operation of the preset operation, to obtain N pieces of second original frequency domain data. The second communication apparatus processes the N pieces of first original frequency domain data and the N pieces of second original frequency domain data according to a maximum ratio combining (MRC) algorithm, to obtain the N piece of original frequency domain data. Alternatively, the second communication apparatus obtains N pieces of first original frequency domain data carried on the first group of subcarriers. The second communication apparatus performs a cyclic shift of odd-numbered bits on data on the second group of subcarriers, then performs negation (multiplied by −1) on data on subcarriers at even positions or data on subcarriers at odd positions, and then performs an inverse operation of the preset operation, to obtain N pieces of second original frequency domain data. The second communication apparatus processes the N pieces of first original frequency domain data and the N pieces of second original frequency domain data according to a maximum ratio combining (MRC) algorithm, to obtain the N piece of original frequency domain data.

Optionally, after obtaining the N pieces of original frequency domain data, the second communication apparatus may demap the N pieces of original frequency domain data to generate confidence of a corresponding bit sequence, send the confidence to a channel decoding module for decoding, and then descramble an information bit obtained after channel decoding to obtain an original information bit.

It can be learned that in this embodiment, a PAPR can be reduced, and PAPR distribution after frequency domain duplication is basically consistent with PAPR distribution before the frequency domain duplication, thereby resolving a problem of a high PAPR caused by the frequency domain duplication. In this embodiment, a corresponding receive end processing process is further designed, to restore original data.

The foregoing content describes in detail the methods provided in the present disclosure. To better implement the foregoing solutions in embodiments of the present disclosure, an embodiment of the present disclosure further provides a corresponding apparatus or device.

In embodiments of the present disclosure, functional modules in the first communication apparatus and the second communication apparatus may be divided based on the foregoing method example. For example, the functional modules may be divided corresponding to the functions.

Alternatively, two or more functions may be integrated into a processing module. The integrated module may be implemented in a form of hardware, or may be implemented in a form of a software functional module. It should be noted that in embodiments of the present disclosure, division into modules is an example and is merely logical function division, and may be other division in actual implementation. The following describes in detail the first communication apparatus and the second communication apparatus in this embodiment with reference to FIG. 9 and FIG. 10.

Figure 9:
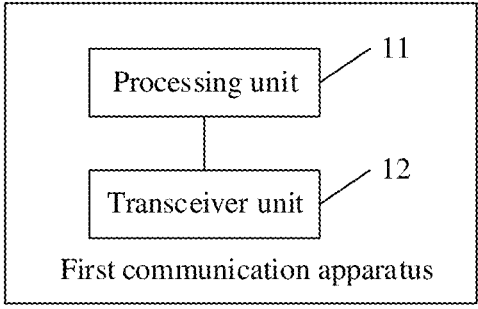
FIG. 9 is a schematic diagram of a structure of a first communication apparatus according to an embodiment of the present disclosure.

When an integrated unit is used, FIG. 9 is a schematic diagram of a structure of a first communication apparatus according to an embodiment of the present disclosure. As shown in FIG. 9, the first communication apparatus includes: a processing unit 11 and a transceiver unit 12.

In a first example embodiment, the processing unit 11 is configured to generate a first frequency domain signal; and the transceiver unit 12 is configured to send the first frequency domain signal. The first frequency domain signal includes a subsignal obtained by mapping N pieces of first frequency domain data to a first group of subcarriers and a subsignal obtained by mapping N pieces of second frequency domain data to a second group of subcarriers, and a spacing between the first group of subcarriers and the second group of subcarriers is odd-numbered subcarriers. The N pieces of first frequency domain data are obtained by performing phase rotation on data at even positions or data at odd positions in N pieces of original frequency domain data, the N pieces of second frequency domain data are obtained by performing a preset operation on the N pieces of first frequency domain data, and all the N pieces of original frequency domain data are real numbers. N is an integer greater than 1.

Optionally, an angle of the phase rotation is any one of the following angles: 90°, −90°, and 180°. The preset operation includes reverse arrangement and/or negation.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the N pieces of first frequency domain data are represented as [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. $Y(k)=-X(N-k-1)$ or $Y(k)=X(N-k-1)$, and $0 \leq k \leq N-1$.

It should be understood that the first communication apparatus in the first example embodiment may correspondingly perform Embodiment 1, and the foregoing operations or functions of the units in the first communication apparatus are separately used to implement corresponding operations of the first communication apparatus in Embodiment 1. For brevity, In a second example embodiment, the processing unit 11 is configured to generate a first frequency domain signal; and the transceiver unit 12 is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are obtained by performing phase rotation on data at even positions or data at odd positions in N pieces of original frequency domain data. The N pieces of second frequency domain data are obtained by performing a preset operation on the N pieces of first frequency domain data. N is an integer greater than 1. All the N pieces of original frequency domain data are real numbers.

Optionally, an angle of the phase rotation is any one of the following angles: 90°, −90°, and 180°. The preset operation includes reverse arrangement and/or negation.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the cyclic shift of the odd-numbered bits is a cyclic shift of one bit to the left or a cyclic shift of one bit to the right. The N pieces of first frequency domain data are represented as [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. [X(1), X(2), . . . , X(N−1), X(0)] is obtained by performing a cyclic shift of one bit to the left on the N pieces of first frequency domain data, and [X(N−1), X(0), X(1), X(2), . . . , X(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N−1), Y(0), Y(1), Y(2), . . . , Y(N−2)] is obtained by performing a cyclic shift of one bit to the right on the N pieces of second frequency domain data. $Y(k)=-X(N-k-1)$ or $Y(k)=X(N-k-1)$, and $0 \leq k \leq N-1$.

It should be understood that the first communication apparatus in the second example embodiment may correspondingly perform Embodiment 2, and the foregoing operations or functions of the units in the first communication apparatus are separately used to implement corresponding operations of the first communication apparatus in Embodiment 2. For brevity, In a third example embodiment, the processing unit 11 is configured to generate a first frequency domain signal; and the transceiver unit 12 is configured to send the first frequency domain signal. The first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The N pieces of first frequency domain data are N pieces of original frequency domain data. The N pieces of second frequency domain data are obtained by performing negation on data at even positions or data at odd positions in the N pieces of original frequency domain data and performing a preset operation on the N pieces of original frequency domain data. N is an integer greater than 1.

Optionally, the preset operation includes one or more of conjugation and reverse arrangement.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the N pieces of original frequency domain data are represented as [D(0), D(1), D(2), . . . , D(N−1)], where D( ) represents original frequency domain data, and the N pieces of first frequency domain data are represented as [D(0), D(1), D(2), . . . , D(N−1)]. The N pieces of second frequency domain data are represented as [Y(0), Y(1), Y(2), . . . , Y(N−1)], where Y( ) represents the second frequency domain data.

$$Y(k) \begin{cases} conj(D(N-k-1)) \times (-1)^k \\ conj(D(N-k-1)) \times (-1)^{k+1} \end{cases},$$

$$\text{where } 0 \le k \le N-1,$$

where 0≤k≤N−1, and conj( ) represents conjugation.

It should be understood that the first communication apparatus in the third example embodiment may correspondingly perform Embodiment 3, and the foregoing operations or functions of the units in the first communication apparatus are separately used to implement corresponding operations of the first communication apparatus in Embodiment 3. For brevity, In a fourth example embodiment, the processing unit 11 is configured to generate a first frequency domain signal; and the transceiver unit 12 is configured to send the first frequency domain signal. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1.

Optionally, the preset operation includes one or more of conjugation and reverse arrangement.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the cyclic shift of odd-numbered bits is a cyclic shift of one bit to the left or to the right, the N pieces of original frequency domain data are [D(0), D(1), D(2), . . . , D(N−1)], and the N pieces of second frequency domain data are [Y(0), Y(1), Y(2), . . . , Y(N−1)], where D( ) represents the original frequency domain data, and Y( ) represents the second frequency domain data. [D(1), D(2), . . . , D(N−1), D(0)] is obtained by performing a cyclic shift of one bit to the left on the N pieces of first frequency domain data, and [D(N−1), D(0), D(1), D(2), . . . , D(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N−1), Y(0), Y(1), Y(2), . . . , Y(N2)] is obtained by performing a cyclic shift of one bit to the right on the N pieces of second frequency domain data.

$$Y(k) \begin{cases} conj(D(N-k-1)) \times (-1)^k \\ conj(D(N-k-1)) \times (-1)^{k+1} \end{cases},$$

$$\text{where } 0 \le k \le N-1,$$

and conj( ) represents conjugation.

Figure 10:
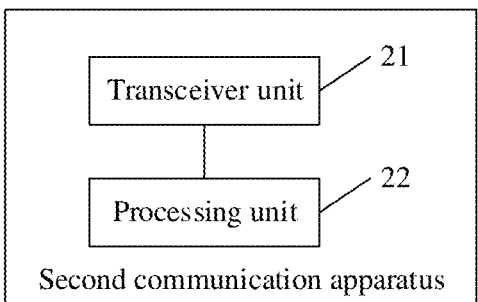
FIG. 10 is a schematic diagram of a structure of a second communication apparatus according to an embodiment of the present disclosure.

It should be understood that the first communication apparatus in the fourth example embodiment may correspondingly perform Embodiment 4, and the foregoing operations or functions of the units in the first communication apparatus are separately used to implement corresponding operations of the first communication apparatus in Embodiment 4. For brevity, FIG. 10 is a schematic diagram of a structure of a second communication apparatus according to an embodiment of the present disclosure. As shown in FIG. 10, the second communication apparatus includes: a transceiver unit 21 and a processing unit 22.

In a first example embodiment, the transceiver unit 21 is configured to receive a second frequency domain signal, where the second frequency domain signal is obtained after a first frequency domain signal is transmitted through a radio channel; and the processing unit 22 is further configured to perform preset processing on the second frequency domain signal to obtain N pieces of original frequency domain data. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are obtained by performing phase rotation on data at even positions or data at odd positions in the N pieces of original frequency domain data. The N pieces of second frequency domain data are obtained by performing a preset operation on the N pieces of first frequency domain data. N is an integer greater than 1. All the N pieces of original frequency domain data are real numbers.

Optionally, the processing unit 22 is further configured to perform reverse phase rotation on data on subcarriers at even positions or data on subcarriers at odd positions in the first group of subcarriers, to obtain the N pieces of original frequency domain data.

Optionally, the processing unit 22 is further configured to perform an inverse operation of the preset operation on data on the second group of subcarriers, to obtain the N pieces of first frequency domain data; and then perform reverse phase rotation on data at even positions or data at odd positions in the N pieces of first frequency domain data, to obtain the N pieces of original frequency domain data.

Optionally, the processing unit 22 is further configured to: perform reverse phase rotation on data on subcarriers at even positions or data on subcarriers at odd positions in the first group of subcarriers, to obtain first original frequency domain data; and perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data.

Optionally, an angle of the reverse phase rotation is any one of the following angles: −90°, 90°, and 180°. The inverse operation of the preset operation includes reverse arrangement and/or negation.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the N pieces of first frequency domain data are represented as [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. Y(k)=−X(N−k−1) or Y(k)=X(N−k−1), and 0≤k≤N−1.

It should be understood that the second communication apparatus in the first example embodiment may correspondingly perform Embodiment 1, and the foregoing operations or functions of the units in the second communication apparatus are separately used to implement corresponding operations of the second communication apparatus in Embodiment 1. For brevity, In a second example embodiment, the transceiver unit 21 is configured to receive a second frequency domain signal; and the processing unit 22 is further configured to perform preset processing on the second frequency domain signal, to obtain N pieces of original frequency domain data. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers; or the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The N pieces of first frequency domain data are obtained by performing phase rotation on data at even positions or data at odd positions in the N pieces of original frequency domain data. The N pieces of second frequency domain data are obtained by performing a preset operation on the N pieces of first frequency domain data. N is an integer greater than 1. All the N pieces of original frequency domain data are real numbers.

Optionally, the processing unit 22 is further configured to perform a cyclic shift of odd-numbered bits on data on the first group of subcarriers and then perform reverse phase rotation on data on subcarriers at even positions or data on subcarriers at odd positions, to obtain the N pieces of original frequency domain data. Alternatively, the processing unit 22 is further configured to perform reverse phase rotation on data on subcarriers at even positions or data on subcarriers at odd positions in the first group of subcarriers, to obtain the N pieces of original frequency domain data.

Optionally, the processing unit 22 is further configured to perform an inverse operation of the preset operation on data on the second group of subcarriers, to obtain the N pieces of first frequency domain data. Alternatively, the processing unit 22 is further configured to perform a cyclic shift of odd-numbered bits on data on the second group of subcarriers and then perform an inverse operation of the preset operation, to obtain the N pieces of first frequency domain data; and then perform reverse phase rotation on data at even positions or data at odd positions in the N pieces of first frequency domain data, to obtain the N pieces of original frequency domain data.

Optionally, the processing unit 22 is further configured to perform a cyclic shift of odd-numbered bits on data on the first group of subcarriers and then perform reverse phase rotation on data on subcarriers at even positions or data on subcarriers at odd positions, to obtain N pieces of first original frequency domain data; perform reverse phase rotation on data on subcarriers at even positions or data on subcarriers at odd positions in the second group of subcarriers and then perform an inverse operation of the preset operation, to obtain N pieces of second original frequency domain data; and process the N pieces of first original frequency domain data and the N pieces of second original frequency domain data according to a maximum ratio combining algorithm, to obtain the N pieces of original frequency domain data. Alternatively, the processing unit 22 is further configured to perform reverse phase rotation on data on subcarriers at even positions or data on subcarriers at odd positions in the first group of subcarriers, to obtain N pieces of first original frequency domain data; perform a cyclic shift of odd-numbered bits on data on the second group of subcarriers, and then performs an inverse operation of the preset operation to obtain the N pieces of first frequency domain data; perform reverse phase rotation on data at even positions or data at odd positions in the N pieces of first frequency domain data, to obtain N pieces of second original frequency domain data; and process the N pieces of first original frequency domain data and the N pieces of second original frequency domain data according to a maximum ratio combining algorithm, to obtain the N pieces of original frequency domain data.

Optionally, an angle of the reverse phase rotation is any one of the following angles: 90°, −90°, and 180°. The preset operation includes reverse arrangement and/or negation.

Optionally, an angle of the reverse phase rotation is any one of the following angles: −90°, 90°, and 180°. The inverse operation of the preset operation includes reverse arrangement and/or negation.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the cyclic shift of the odd-numbered bits is a cyclic shift of one bit to the left or a cyclic shift of one bit to the right. The N pieces of first frequency domain data are represented as [X(0), X(1), X(2), . . . , X(N−1)], and the N pieces of second frequency domain data are represented as [Y(0), Y(1), Y(2), . . . , Y(N−1)], where X( ) represents the first frequency domain data, and Y( ) represents the second frequency domain data. [X(1), X(2), . . . , X(N−1), X(0)] is obtained by performing a cyclic shift of one bit to the left on the N pieces of first frequency domain data, and [X(N−1), X(0), X(1), X(2), . . . , X(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N−1), Y(0), Y(1), Y(2), . . . , Y(N−2)] is obtained by performing a cyclic shift of one bit to the right on the N pieces of second frequency domain data. Y(k)=−X(N−k−1) or Y(k)=X(N−k−1), and 0≤k≤N−1.

It should be understood that the second communication apparatus in the second example embodiment may correspondingly perform Embodiment 2, and the foregoing operations or functions of the units in the second communication apparatus are separately used to implement corresponding operations of the second communication apparatus in Embodiment 2. For brevity, In a third example embodiment, the transceiver unit 21 is configured to receive a second frequency domain signal, where the second frequency domain signal is obtained after a first frequency domain signal is transmitted through a radio channel; and the processing unit 22 is further configured to perform preset processing on the second frequency domain signal, to obtain N pieces of original frequency domain data. The first frequency domain signal includes a subsignal obtained by mapping N pieces of first frequency domain data to a first group of subcarriers and a subsignal obtained by sequentially mapping N pieces of second frequency domain data to a second group of subcarriers. A spacing between the first group of subcarriers and the second group of subcarriers is odd-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are the N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1.

Optionally, the processing unit 22 is further configured to obtain the N pieces of original frequency domain data carried on the first group of subcarriers.

Optionally, the processing unit 22 is further configured to perform negation (multiplied by −1) on data on subcarriers at even positions or data on subcarriers at odd positions in the second group of subcarriers, and then perform an inverse operation of the preset operation, to obtain the N pieces of original frequency domain data.

Optionally, the processing unit 22 is further configured to obtain N pieces of first original frequency domain data carried on the first group of subcarriers; perform negation (multiplied by −1) on data on subcarriers at even positions or data on subcarriers at odd positions in the second group of subcarriers (for example, the last N subcarriers), and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

Optionally, the inverse operation of the preset operation includes one or more of conjugation and reverse arrangement.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the N pieces of original frequency domain data are represented as [D(0), D(1), D(2), . . . , D(N−1)], where D( ) represents original frequency domain data, and the N pieces of first frequency domain data are represented as [D(0), D(1), D(2), . . . , D(N−1)]. The N pieces of second frequency domain data are represented as [Y(0), Y(1), Y(2), . . . , Y(N−1)], where Y( ) represents the second frequency domain data.

$$Y(k) \begin{cases} conj(D(N-k-1)) \times (-1)^k \\ conj(D(N-k-1)) \times (-1)^{k+1} \end{cases},$$

$$\text{where } 0 \le k \le N-1,$$

and conj( ) represents conjugation.

It should be understood that the second communication apparatus in the third example embodiment may correspondingly perform Embodiment 3, and the foregoing operations or functions of the units in the second communication apparatus are separately used to implement corresponding operations of the second communication apparatus in Embodiment 3. For brevity, In a fourth example embodiment, the transceiver unit 21 is configured to receive a second frequency domain signal, where the second frequency domain signal is obtained after a first frequency domain signal is transmitted through a radio channel; and the processing unit 22 is further configured to perform preset processing on the second frequency domain signal, to obtain N pieces of original frequency domain data. The first frequency domain signal includes a subsignal obtained by performing a cyclic shift of odd-numbered bits on N pieces of first frequency domain data and then mapping the N pieces of first frequency domain data to a first group of subcarriers and a subsignal obtained by mapping N pieces of second frequency domain data to a second group of subcarriers. Alternatively, the first frequency domain signal includes a subsignal obtained by mapping N pieces of first frequency domain data to a first group of subcarriers and a subsignal obtained by performing a cyclic shift of odd-numbered bits on N pieces of second frequency domain data and then mapping the N pieces of second frequency domain data to a second group of subcarriers. A spacing between the first group of subcarriers and the second group of subcarriers is even-numbered subcarriers. The first group of subcarriers and the second group of subcarriers each include N evenly spaced subcarriers, and subcarriers included in the first group of subcarriers do not overlap subcarriers included in the second group of subcarriers. The N pieces of first frequency domain data are the N pieces of original frequency domain data, and the N pieces of second frequency domain data are obtained by performing negation on data at even positions or data at odd positions in the N pieces of original frequency domain data and performing a preset operation on the N pieces of original frequency domain data. N is an integer greater than 1.

Optionally, the processing unit 22 is further configured to perform a cyclic shift of odd-numbered bits on data on the first group of subcarriers, to obtain the N pieces of original frequency domain data. Alternatively, the processing unit 22 is further configured to obtain the N pieces of original frequency domain data carried on the first group of subcarriers.

Optionally, the processing unit 22 is further configured to perform negation (multiplied by −1) on data on subcarriers at even positions or data on subcarriers at odd positions in the second group of subcarriers, and then perform an inverse operation of the preset operation, to obtain the N pieces of original frequency domain data. Alternatively, the processing unit 22 is further configured to perform a cyclic shift of odd-numbered bits on data on the second group of subcarriers, then perform negation (multiplied by −1) on data on subcarriers at even positions or data on subcarriers at odd positions, and then perform an inverse operation of the preset operation, to obtain the N pieces of original frequency domain data.

Optionally, the processing unit 22 is further configured to perform a cyclic shift of odd-numbered bits on data on the first group of subcarriers, to obtain N pieces of first original frequency domain data; perform negation (multiplied by −1) on data on subcarriers at even positions or data on subcarriers at odd positions in the second group of subcarriers, and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

Optionally, the processing unit 22 is further configured to obtain N pieces of first original frequency domain data carried on the first group of subcarriers; perform a cyclic shift of odd-numbered bits on data on the second group of subcarriers and then perform negation (multiplied by −1) on data on subcarriers at even positions or data on subcarriers at odd positions, and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

Optionally, the inverse operation of the preset operation includes one or more of conjugation and reverse arrangement.

Optionally, N is a quantity of subcarriers carried in a frequency band of a preset size. For example, N is a quantity of subcarriers carried in an RU. The N subcarriers include one or more of the following subcarriers: a data subcarrier, a pilot subcarrier, and a null subcarrier.

Optionally, the N pieces of original frequency domain data include one or more of the following: data obtained by performing constellation mapping on one or more pieces of original data, one or more ±1, and one or more 0.

Optionally, the N subcarriers included in the first group of subcarriers and the N subcarriers included in the second group of subcarriers respectively belong to different resource units, and sizes of the two resource units are equal.

Optionally, the cyclic shift of odd-numbered bits is a cyclic shift of one bit to the left or to the right, the N pieces of original frequency domain data are [D(0), D(1), D(2), . . . , D(N−1)], and the N pieces of second frequency domain data are [Y(0), Y(1), Y(2), . . . , Y(N−1)], where D( ) represents the original frequency domain data, and Y( ) represents the second frequency domain data. [D(1), D(2), . . . , D(N−1), D(0)] is obtained by performing a cyclic shift of one bit to the left on the N pieces of first frequency domain data, and [D(N−1), D(0), D(1), D(2), . . . , D(N−2)] is obtained by performing a cyclic shift of one bit to the right on the N pieces of first frequency domain data. [Y(1), Y(2), . . . , Y(N−1), Y(0)] is obtained by performing a cyclic shift of one bit to the left on the N pieces of second frequency domain data, and [Y(N–1), Y(0), Y(1), Y(2), . . . , Y(N–2)] is obtained by performing a cyclic shift of one bit to the right on the N pieces of second frequency domain data.

$$Y(k) \begin{cases} conj(D(N-k-1)) \times (-1)^k \\ conj(D(N-k-1)) \times (-1)^{k+1} \end{cases},$$

$$\text{where } 0 \le k \le N-1,$$

where $0 \le k \le N-1$, an conj represents conjugation.

It should be understood that the second communication apparatus in the fourth example embodiment may correspondingly perform Embodiment 4, and the foregoing operations or functions of the units in the second communication apparatus are separately used to implement corresponding operations of the second communication apparatus in Embodiment 4. For brevity, The foregoing describes the first communication apparatus and the second communication apparatus in embodiments of the present disclosure. The following describes possible product forms of the first communication apparatus and the second communication apparatus. It should be understood that any product in any form that has a function of the first communication apparatus in FIG. 9 or the second communication apparatus in FIG. 10 falls within the protection scope of embodiments of the present disclosure. It should be further understood that the following description is merely an example, and the product forms of the first communication apparatus and the second communication apparatus in embodiments of the present disclosure are not limited thereto.

In a possible product form, the first communication apparatus and the second communication apparatus in embodiments of the present disclosure may be implemented by using a general bus architecture.

The first communication apparatus includes a processor and a transceiver that is internally connected to and communicates with the processor. In an implementation, the processing unit in FIG. 9 may be implemented by the processor of the first communication apparatus, and the transceiver unit in FIG. 9 may be implemented by the transceiver that is internally connected to and communicates with the processor. For specific functions of the processor and the transceiver, refer to the descriptions of the processing unit and the transceiver unit in FIG. 9.

Optionally, the first communication apparatus may further include a memory. The memory is configured to be coupled to the processor, and the memory stores program instructions and data that are necessary for the first communication apparatus.

The second communication apparatus includes a processor and a transceiver that is internally connected to and communicates with the processor. In an implementation, the processing unit in FIG. 10 may be implemented by the processor of the second communication apparatus, and the transceiver unit in FIG. 10 may be implemented by the transceiver that is internally connected to and communicates with the processor. For specific functions of the processor and the transceiver, refer to the descriptions of the processing unit and the transceiver unit in FIG. 10.

Optionally, the second communication apparatus may further include a memory. The memory is configured to be coupled to the processor, and the memory stores program instructions and data that are necessary for the second communication apparatus.

In a possible product form, the first communication apparatus and the second communication apparatus in embodiments of the present disclosure may be implemented by using a general purpose processor.

The general purpose processor for implementing the first communication apparatus includes a processing circuit and an input/output interface that is internally connected to and communicates with the processing circuit. In an implementation, the processing unit in FIG. 9 may be implemented by the processing circuit of the first communication apparatus, and the transceiver unit in FIG. 9 may be implemented by the input/output interface that is internally connected to and communicates with the processing circuit. For specific functions of the processing circuit and the input/output interface, refer to the descriptions of the processing unit and the transceiver unit in FIG. 9.

Optionally, the first communication apparatus may further include a storage circuit. The storage circuit is configured to be coupled to the processing circuit, and the storage circuit stores program instructions and data that are necessary for the first communication apparatus.

The general purpose processor for implementing the second communication apparatus includes a processing circuit and an input/output interface that is internally connected to and communicates with the processing circuit. In an implementation, the processing unit in FIG. 10 may be implemented by the processing circuit of the second communication apparatus, and the transceiver unit in FIG. 10 may be implemented by the input/output interface that is internally connected to and communicates with the processing circuit. For specific functions of the processing circuit and the input/output interface, refer to the descriptions of the processing unit and the transceiver unit in FIG. 10.

Optionally, the second communication apparatus may further include a storage circuit. The storage circuit is configured to be coupled to the processing circuit, and the storage circuit stores program instructions and data that are necessary for the second communication apparatus.

It should be understood that the communication apparatuses in the foregoing various product forms have any function of the first communication apparatus and the second communication apparatus in the foregoing method embodiments.

An embodiment of the present disclosure further provides a computer-readable storage medium. The computer-readable storage medium stores computer program code. When the foregoing processor executes the computer program code, an electronic device performs the method in any one of the foregoing embodiments.

An embodiment of the present disclosure further provides a computer program product. When the computer program product is run on a computer, the computer is enabled to perform the method in any one of the foregoing embodiments.

An embodiment of the present disclosure further provides a communication apparatus. The apparatus may exist in a product form of a chip. A structure of the apparatus includes a processor and an interface circuit. The processor is configured to communicate with another apparatus through the interface circuit, so that the apparatus performs the method in any one of the foregoing embodiments.

Method or algorithm steps described in combination with the content disclosed in the present disclosure may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete components.

A person of skill in the art should be aware that in one or more of the foregoing examples, the functions described in the present disclosure may be implemented by using hardware, software, firmware, or any combination thereof. When the present invention is implemented by software, the foregoing functions may be stored in a computer-readable medium or transmitted as one or more instructions or code in the computer-readable medium. The computer-readable medium includes a computer-readable storage medium and a communication medium, where the communication medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification or improvement made based on the technical solutions of the present disclosure shall fall within the protection scope of the present disclosure.

What is claimed is:

1. A communication method in a wireless local area network, comprising:

receiving, by a communication apparatus, a second frequency domain signal, wherein the second frequency domain signal is obtained after a first frequency domain signal is transmitted through a radio channel, the first frequency domain signal comprises a subsignal obtained by mapping N pieces of first frequency domain data to a first group of subcarriers and a subsignal obtained by mapping N pieces of second frequency domain data to a second group of subcarriers, a spacing between the first group of subcarriers and the second group of subcarriers is odd-numbered subcarriers, the first group of subcarriers and the second group of subcarriers each comprise N evenly spaced subcarriers, subcarriers comprised in the first group of subcarriers do not overlap subcarriers comprised in the second group of subcarriers, and N is an integer greater than 1; and the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data, the present operation comprising at least one of revers arrangement, negation or conjugation; and performing, by the communication apparatus, preset processing on the second frequency domain signal, to obtain the N pieces of original frequency domain data, the preset processing comprising performing an inverse operation of the preset operation.

2. The method according to claim 1, wherein the performing, by the communication apparatus, preset processing on the second frequency domain signal, to obtain the N pieces of original frequency domain data comprises:

performing, by the communication apparatus, reverse phase rotation on data on subcarriers at even positions or data on subcarriers at odd positions in the first group of subcarriers, to obtain the N pieces of original frequency domain data.

3. The method according to claim 1, wherein the performing, by the communication apparatus, preset processing on the second frequency domain signal, to obtain the N pieces of original frequency domain data comprises:

performing, by the communication apparatus, an inverse operation of the preset operation on data on the second group of subcarriers, to obtain the N pieces of first frequency domain data; and performing, by the communication apparatus, reverse phase rotation on data at even positions or data at odd positions in the N pieces of first frequency domain data, to obtain the N pieces of original frequency domain data.

4. The method according to claim 1, wherein the performing, by the communication apparatus, preset processing on the second frequency domain signal, to obtain the N pieces of original frequency domain data comprises:

performing, by the communication apparatus, reverse phase rotation on data on subcarriers at even positions or data on subcarriers at odd positions in the first group of subcarriers, to obtain N pieces of first original frequency domain data;

performing, by the communication apparatus, reverse phase rotation on data on subcarriers at even positions or data on subcarriers at odd positions in the second group of subcarriers, and then performing an inverse operation of the preset operation, to obtain N pieces of second original frequency domain data; and processing, by the communication apparatus, the N pieces of first original frequency domain data and the N pieces of second original frequency domain data according to a maximum ratio combining algorithm, to obtain the N piece of original frequency domain data.

5. The method according to claim 1, wherein an angle of the phase rotation is 90°, −90°, or 180°; and the preset operation comprises reverse arrangement and/or negation.

6. The method according to claim 3, wherein an angle of the reverse phase rotation is −90°, 90°, or 180°; and the inverse operation of the preset operation comprises reverse arrangement and/or negation.

7. The method according to claim 1, wherein N is a quantity of subcarriers carried in a frequency band of a preset size; and the N subcarriers comprise: a data subcarrier, a pilot subcarrier, and/or a null subcarrier.

8. The method according to claim 1, wherein the N pieces of original frequency domain data comprise:

data obtained by performing constellation mapping on one or more pieces of original data, one or more of ±1, and/or one or more of 0.

9. The method according to claim 1, wherein the N pieces of first frequency domain data are [X(0), X(1), X(2), . . . , X(N−1)], the N pieces of second frequency domain data are [Y(0), Y(1), Y(2), . . . , Y(N−1)], wherein X( ) represents the first frequency domain data, and Y( ) represents the second frequency domain data; and $Y(k)=-X(N-k-1)$ or $Y(k)=X(N-k-1)$, and $0 \leq k \leq N-1$.

10. A communication apparatus, comprising at least one processor and a transceiver, wherein the transceiver is configured to receive a second frequency domain signal, wherein the second frequency domain signal is obtained after a first frequency domain signal is transmitted through a radio channel, the first frequency domain signal comprises a subsignal obtained by mapping N pieces of first frequency domain data to a first group of subcarriers and a subsignal obtained by mapping N pieces of second frequency domain data to a second group of subcarriers, a spacing between the first group of subcarriers and the second group of subcarriers is odd-numbered subcarriers, the first group of subcarriers and the second group of subcarriers each comprise N evenly spaced subcarriers, subcarriers comprised in the first group of subcarriers do not overlap subcarriers comprised in the second group of subcarriers, and N is an integer greater than 1; and the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data, the preset operation comprising at least one of reverse arrangement, negation or conjugation; and the at least one processor is configured to perform preset processing on the second frequency domain signal, to obtain the N pieces of original frequency domain data, the preset processing comprising performing an inverse operation of the preset operation.

11. The apparatus according to claim 10, wherein the at least one processor is configured to perform reverse phase rotation on data on subcarriers at even positions or data on subcarriers at odd positions in the first group of subcarriers, to obtain the N pieces of original frequency domain data.

12. The apparatus according to claim 10, wherein the at least one processor is configured to perform an inverse operation of the preset operation on data on the second group of subcarriers, to obtain the N pieces of first frequency domain data; and perform reverse phase rotation on data at even positions or data at odd positions in the N pieces of first frequency domain data, to obtain the N pieces of original frequency domain data.

13. The apparatus according to claim 10, wherein the at least one processor is configured to:

perform reverse phase rotation on data on subcarriers at even positions or data on subcarriers at odd positions in the first group of subcarriers, to obtain N pieces of first original frequency domain data;

perform reverse phase rotation on data on subcarriers at even positions or data on subcarriers at odd positions in the second group of subcarriers, and then perform an inverse operation of the preset operation, to obtain N pieces of second original frequency domain data; and process the N pieces of first original frequency domain data and the N pieces of second original frequency domain data according to a maximum ratio combining algorithm, to obtain the N piece of original frequency domain data.

14. The apparatus according to claim 10, wherein an angle of the phase rotation is 90°, −90°, or 180°; and the preset operation comprises reverse arrangement and/or negation.

15. The apparatus according to claim 12, wherein an angle of the reverse phase rotation is −90°, 90°, or 180°; and the inverse operation of the preset operation comprises reverse arrangement and/or negation.

16. The apparatus according to claim 10, wherein N is a quantity of subcarriers carried in a frequency band of a preset size; and the N subcarriers comprise one or more of the following subcarriers: a data subcarrier, a pilot subcarrier, and a null subcarrier.

17. The apparatus according to claim 10, wherein the N pieces of original frequency domain data comprise:

data obtained by performing constellation mapping on one or more pieces of original data, one or more ±1, and/or one or more 0.

18. The apparatus according to claim 10, wherein the N pieces of first frequency domain data are [X(0), X(1), X(2), . . . , X(N−1)], the N pieces of second frequency domain data are [Y(0), Y(1), Y(2), . . . , Y(N−1)], wherein XO represents the first frequency domain data, and Y) represents the second frequency domain data; and $Y(k)=-X(N-k-1)$ or $Y(k)=X(N-k-1)$, and $0 \leq k \leq N-1$.

19. A non-transitory, computer-readable storage medium, wherein the computer-readable storage medium stores program instructions that, when executed by a computer, enable the computer to:

receive a second frequency domain signal, wherein the second frequency domain signal is obtained after a first frequency domain signal is transmitted through a radio channel, the first frequency domain signal comprises a subsignal obtained by mapping N pieces of first frequency domain data to a first group of subcarriers and a subsignal obtained by mapping N pieces of second frequency domain data to a second group of subcarriers, a spacing between the first group of subcarriers and the second group of subcarriers is odd-numbered subcarriers, the first group of subcarriers and the second group of subcarriers each comprise N evenly spaced subcarriers, subcarriers comprised in the first group of subcarriers do not overlap subcarriers comprised in the second group of subcarriers, and N is an integer greater than 1; and the N pieces of first frequency domain data are obtained by performing phase rotation on data at even positions or data at odd positions in N pieces of original frequency domain data, and the N pieces of second frequency domain data are obtained by performing a preset operation on the N pieces of first frequency domain data, the preset operation comprising at least one of reverse arrangement, negation or conjugation; and perform preset processing on the second frequency domain signal, to obtain the N pieces of original frequency domain data, the preset processing comprising performing an inverse operation of the preset operation.

* * * * *